US012601889B2

(12) United States Patent　　(10) Patent No.:　US 12,601,889 B2
Chang et al.　　(45) Date of Patent:　Apr. 14, 2026

(54) IMAGING LENS ASSEMBLY, CAMERA MODULE AND ELECTRONIC DEVICE

(71) Applicant: LARGAN PRECISION CO., LTD., Taichung (TW)

(72) Inventors: Lin An Chang, Taichung (TW); Chin Li Hsieh, Taichung (TW); Chun-Hua Tsai, Taichung (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 753 days.

(21) Appl. No.: 17/887,328

(22) Filed: Aug. 12, 2022

(65) Prior Publication Data

US 2023/0408787 A1　　Dec. 21, 2023

(30) Foreign Application Priority Data

Jun. 15, 2022　(TW) .................................. 111122121

(51) Int. Cl.
*G02B 7/02*　　(2021.01)
*H04N 23/54*　　(2023.01)

(52) U.S. Cl.
CPC ............. *G02B 7/021* (2013.01); *H04N 23/54* (2023.01)

(58) Field of Classification Search
CPC ...... G02B 7/021; G02B 3/04; G02B 13/0045; G02B 13/006; G02B 13/18; G02B 27/0018; G02B 9/62; G02B 13/0015; G02B 1/00; G02B 1/041; G02B 3/00; H04N 23/54; G03B 30/00; B29C 33/56; B29C 33/60; B29C 33/68; B29C 37/0067; B29C 39/026; B29C 39/36
See application file for complete search history.

(56) References Cited

U.S. PATENT DOCUMENTS 8,842,376 B2　9/2014　Yang et al.
9,952,359 B2　4/2018　Chang
(Continued)

FOREIGN PATENT DOCUMENTS

CN　　206074846 U　 *　4/2017
EP　　3 249 439 A1　　11/2017

OTHER PUBLICATIONS

Extended European Search Report dated Jun. 5, 2023 as received in Application No. 22191634.9.

*Primary Examiner* — Matthew Y Lee
(74) *Attorney, Agent, or Firm* — Maschoff Brennan

(57)　　ABSTRACT

An imaging lens assembly includes a first plastic lens element and a second plastic lens element arranged along an optical axis. The first plastic lens element includes, in order from a paraxial region to a peripheral region, a first optically effective portion, a first size reduction portion and a first peripheral portion. An object-side surface and an image-side surface of the first size reduction portion each has a roughened surface. The first peripheral portion is to be in physical contact and assembled with adjacent components. The second plastic lens element includes, in order from a paraxial region to a peripheral region, a second optically effective portion, a second size reduction portion and a second peripheral portion. An object-side surface and an image-side surface of the second size reduction portion each has a roughened surface. The second peripheral portion is to be in physical contact and assembled with adjacent components.

20 Claims, 21 Drawing Sheets

(56)                References Cited

U.S. PATENT DOCUMENTS

| | | | | |
|---|---|---|---|---|
| 10,018,808 | B2 | 7/2018 | Chou | |
| 10,877,244 | B1 | 12/2020 | Chen et al. | |
| 11,307,389 | B2 | 4/2022 | Chou | |
| 2009/0168204 | A1* | 7/2009 | Nishizawa | G02B 7/023 |
| | | | | 359/796 |
| 2009/0321618 | A1* | 12/2009 | Ohara | G02B 13/004 |
| | | | | 250/227.2 |
| 2011/0169912 | A1* | 7/2011 | Abe | G02B 9/60 |
| | | | | 359/717 |
| 2017/0176649 | A1 | 6/2017 | Chang | |
| 2018/0292626 | A1* | 10/2018 | Chou | G02B 13/003 |
| 2020/0142150 | A1* | 5/2020 | Chou | G02B 7/022 |
| 2025/0013010 | A1* | 1/2025 | Sin | H04N 23/55 |

* cited by examiner

OA

9

GL

RS

E1

RS

E2

1

E3

70

70

7

40°~90°

70

IMAGING LENS ASSEMBLY, CAMERA MODULE AND ELECTRONIC DEVICE

RELATED APPLICATIONS

This application claims priority to Taiwan Application 111122121, filed on Jun. 15, 2022, which is incorporated by reference herein in its entirety.

BACKGROUND

Technical Field

The present disclosure relates to an imaging lens assembly, a camera module and an electronic device, more particularly to an imaging lens assembly and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, mobile phones equipped with optical systems are trending towards multi-functionality for various applications, and therefore the functionality requirements for the optical systems have been increasing.

In recent years, there is an increasing demand for electronic devices featuring compact size, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. Generally, in a manufacturing process for optical systems, there may be manufacturing errors in the lens elements, which affects the size precision of the optically effective region of a lens element, thereby affecting the optical performance of the whole optical system. As a result, the optical performance of the actual finished product is degraded.

SUMMARY

According to one aspect of the present disclosure, an imaging lens assembly includes a first plastic lens element and a second plastic lens element. An optical axis of the imaging lens assembly passes through the first plastic lens element and the second plastic lens element.

The first plastic lens element includes, in order from a paraxial region thereof to a peripheral region thereof, a first optically effective portion, a first size reduction portion and a first peripheral portion. Each of an object-side surface and an image-side surface of the first size reduction portion has at least one roughened surface. The first peripheral portion is configured to be in physical contact and assembled with adjacent components.

The second plastic lens element is disposed on an image side of the first plastic lens element, and the second plastic lens element includes, in order from a paraxial region thereof to a peripheral region thereof, a second optically effective portion, a second size reduction portion and a second peripheral portion. Each of an object-side surface and an image-side surface of the second size reduction portion has at least one roughened surface. The second peripheral portion is configured to be in physical contact and assembled with adjacent components.

The imaging lens assembly further includes a glass lens element disposed corresponding to one of the first plastic lens element and the second plastic lens element.

When a central thickness of the first optically effective portion is CT1, a central thickness of the second optically effective portion is CT2, a minimum thickness of the first size reduction portion is ET1m, a peripheral thickness of the first optically effective portion is ET1, a minimum thickness of the second size reduction portion is ET2m, a peripheral thickness of the second optically effective portion is ET2, an edge thickness of the glass lens element is PTG, and a central thickness of the glass lens element is CTG, the following conditions are satisfied:

$$CT1 \leq 0.33 \text{ mm};$$

$$CT2 \leq 0.33 \text{ mm};$$

$$ET1m/ET1 \leq 1.0;$$

$$ET2m/ET2 \leq 1.0; \text{ and}$$

$$0.12 \leq PTG/CTG \leq 1.05.$$

According to another aspect of the present disclosure, an imaging lens assembly includes a first plastic lens element and a second plastic lens element. An optical axis of the imaging lens assembly passes through the first plastic lens element and the second plastic lens element.

The first plastic lens element includes, in order from a paraxial region thereof to a peripheral region thereof, a first optically effective portion, a first size reduction portion and a first peripheral portion. Each of an object-side surface and an image-side surface of the first size reduction portion has at least one roughened surface. The first peripheral portion is configured to be in physical contact and assembled with adjacent components.

The second plastic lens element is disposed on an image side of the first plastic lens element, and the second plastic lens element includes, in order from a paraxial region thereof to a peripheral region thereof, a second optically effective portion, a second size reduction portion and a second peripheral portion. Each of an object-side surface and an image-side surface of the second size reduction portion has at least one roughened surface. The second peripheral portion is configured to be in physical contact and assembled with adjacent components.

When a central thickness of the first optically effective portion is CT1, a central thickness of the second optically effective portion is CT2, a minimum thickness of the first size reduction portion is ET1m, a peripheral thickness of the first optically effective portion is ET1, a minimum thickness of the second size reduction portion is ET2m, a peripheral thickness of the second optically effective portion is ET2, a release force required to release the roughened surfaces of the first size reduction portion is Fr1, a release force required to release the first optically effective portion is Fs1, a release force required to release the roughened surfaces of the second size reduction portion is Fr2, and a release force required to release the second optically effective portion is Fs2, the following conditions are satisfied:

$$CT1 \leq 0.33 \text{ mm};$$

$CT2{\leq}0.33$ mm;

$ET1m/ET1{\leq}1.0;$ $ET2m/ET2{\leq}1.0;$ $1.5{\leq}Fr1/Fs1{\leq}25;$ and $1.5{\leq}Fr2/Fs2{\leq}25.$ According to another aspect of the present disclosure, a camera module includes an image sensor and one of the aforementioned imaging lens assemblies. The image sensor is disposed on an image surface of the imaging lens assembly.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
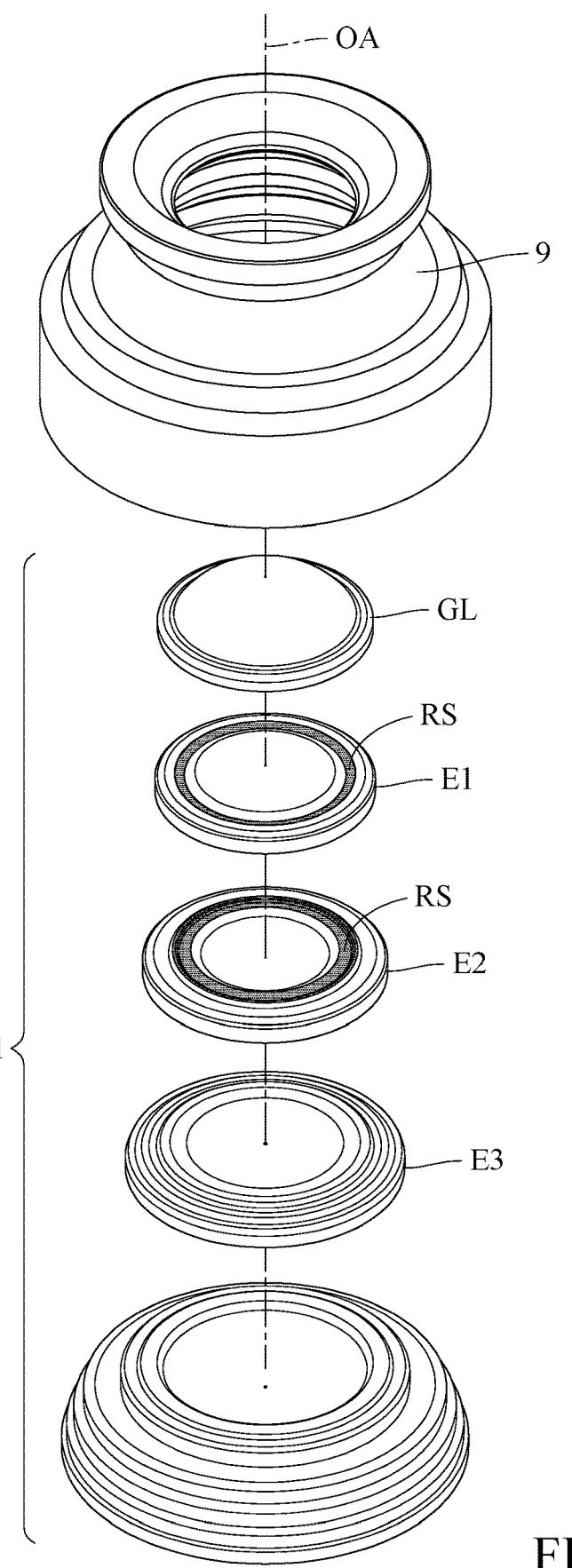
FIG. 1 is an exploded view of an imaging lens assembly and a lens barrel according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens assembly. The imaging lens assembly includes a first plastic lens element and a second plastic lens element. An optical axis of the imaging lens assembly passes through the first plastic lens element and the second plastic lens element, and the second plastic lens element is disposed on an image side of the first plastic lens element. The first plastic lens element includes, in order from a paraxial region thereof to a peripheral region thereof, a first optically effective portion, a first size reduction portion and a first peripheral portion. Each of an object-side surface and an image-side surface of the first size reduction portion has at least one roughened surface, and the first peripheral portion is configured to be in physical contact and assembled with adjacent components. The second plastic lens element includes, in order from a paraxial region thereof to a peripheral region thereof, a second optically effective portion, a second size reduction portion and a second peripheral portion. Each of an object-side surface and an image-side surface of the second size reduction portion has at least one roughened surface, and the second peripheral portion is configured to be in physical contact and assembled with adjacent components. Note that the optically effective portion of the plastic lens element is configured for imaging light to pass therethrough, and the optically effective portion can have an object-side optically effective surface facing toward an object side and an image-side optically effective surface facing toward an image side. Moreover, the peripheral portion of the plastic lens element is configured to be in physical contact and assembled with adjacent components, and the size reduction portion of the plastic lens element is configured to be connected and located between the optically effective portion and the peripheral portion. Moreover, the roughened surface(s) can have a white foggy appearance, which can be distinguishable from the appearance of a transparent smooth surface.

Figure 4:
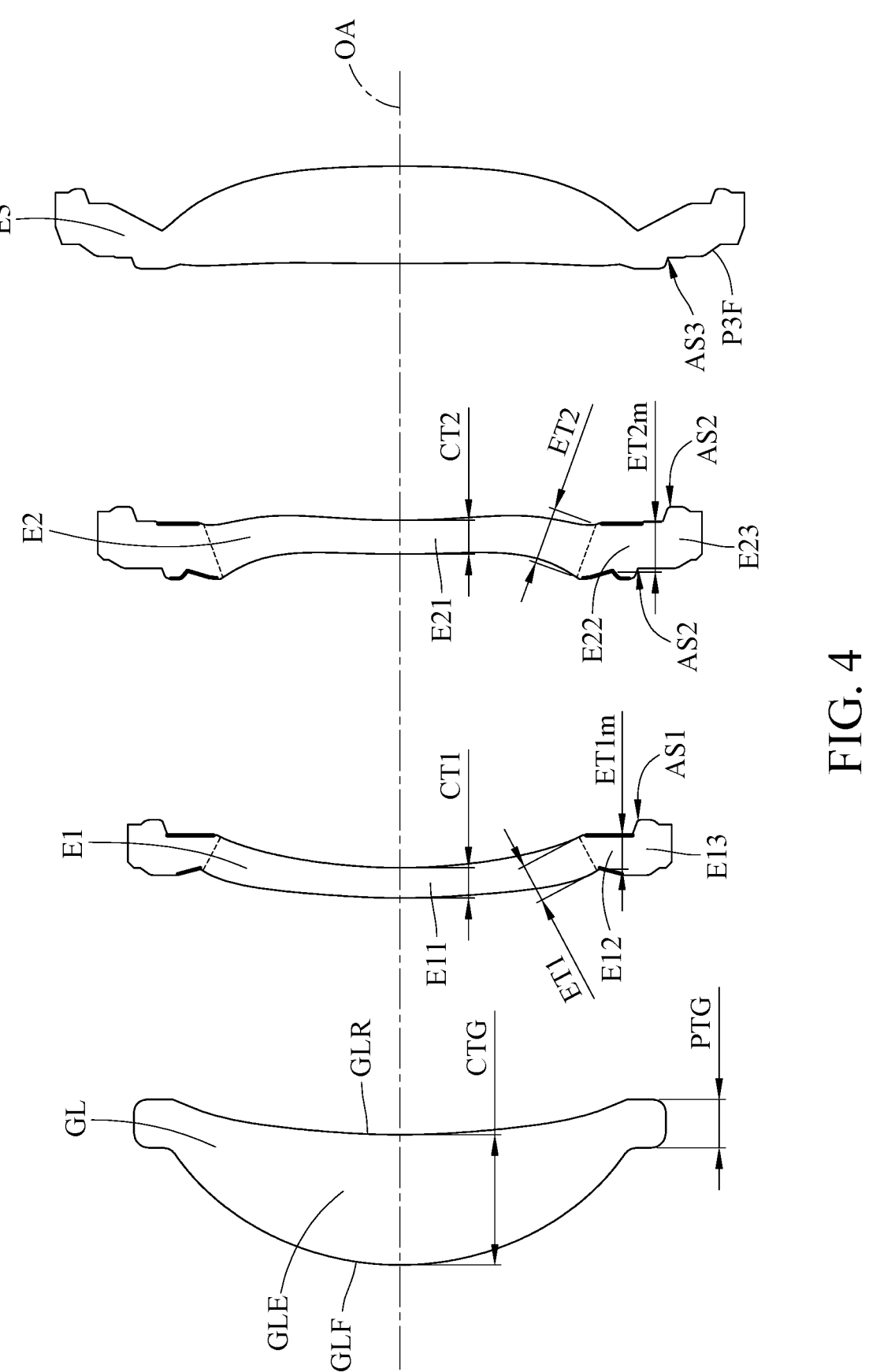
FIG. 4 is an exploded view of a glass lens element, a first plastic lens element, a second plastic lens element and a third plastic lens element in FIG. 3.

When a central thickness of the first optically effective portion is CT1, the following condition is satisfied: $CT1{\leq}0.33$ mm. Therefore, by forming roughened surfaces on the size reduction portion, the manufacturability of high-precision and thin plastic lens elements can be increased, so that the size of a camera module can be reduced. Moreover, the following condition can also be satisfied: $CT1{\leq}0.3$ mm. It is noted that a central thickness of an optically effective portion refers to an axial distance from an object-side optically effective surface of the optically effective portion to an image-side optically effective surface of the optically effective portion. Please refer to FIG. 4, which shows a schematic view of CT1 according to the 1st embodiment of the present disclosure. In FIG. 4, the central thickness CT1 of the first optically effective portion E11 is the axial distance from the object-side optically effective surface E1F to the image-side optically effective surface E1R of the first optically effective portion E11.

When a central thickness of the second optically effective portion is CT2, the following condition is satisfied: CT2≤0.33 mm. Therefore, by forming roughened surfaces on the size reduction portion, the manufacturability of high-precision and thin plastic lens elements can be increased, so that the size of a camera module can be reduced. Moreover, the following condition can also be satisfied: CT2≤0.3 mm. Please refer to FIG. 4, which shows a schematic view of CT2 according to the 1st embodiment of the present disclosure. In FIG. 4, the central thickness CT2 of the second optically effective portion E21 is the axial distance from the object-side optically effective surface E2F to the image-side optically effective surface E2R of the second optically effective portion E21.

When a minimum thickness of the first size reduction portion is ET1m, and a peripheral thickness of the first optically effective portion is ET1, the following condition is satisfied: ET1m/ET1≤1.0. Therefore, it is favorable for increasing the structural strength of the first plastic lens element. It is noted that a peripheral thickness of an optically effective portion refers to a distance from an outermost circumference of an object-side optically effective surface to an outermost circumference of an image-side optically effective surface of the optically effective portion in a direction parallel to the optical axis. Please refer to FIG. 4, which shows a schematic view of ET1m and ET1 according to the 1st embodiment of the present disclosure. In FIG. 4, the peripheral thickness ET1 of the first optically effective portion E11 is the distance from the outermost circumference of the object-side optically effective surface E1F to the outermost circumference of the image-side optically effective surface E1R of the first optically effective portion E11.

When a minimum thickness of the second size reduction portion is ET2m, and a peripheral thickness of the second optically effective portion is ET2, the following condition is satisfied: ET2m/ET2≤1.0. Therefore, it is favorable for increasing the structural strength of the second plastic lens element. Please refer to FIG. 4, which shows a schematic view of ET2m and ET2 according to the 1st embodiment of the present disclosure. In FIG. 4, the peripheral thickness ET2 of the second optically effective portion E21 is the distance from the outermost circumference of the object-side optically effective surface E2F to the outermost circumference of the image-side optically effective surface E2R of the second optically effective portion E21.

According to the present disclosure, by providing at least two plastic lens elements that corresponds to each other and each have roughened surfaces at its size reduction portion, the optical performance of whole optical system can be increased. Furthermore, by forming the roughened surfaces on both of object side and image side of the size reduction portion, the size precision of the optically effective portion can be improved, such that the optical performance of actual final products can be closer to designed and simulated values.

The imaging lens assembly can further include a glass lens element disposed corresponding to one of the first plastic lens element and the second plastic lens element. Therefore, it is favorable for the imaging lens assembly to provide more consistent optical image quality. Moreover, the glass lens element can be a glass molding lens element. Moreover, when an edge thickness of the glass lens element is PTG, and a central thickness of the glass lens element is CTG, the following condition can be satisfied: 0.12≤PTG/CTG≤1.05. Moreover, the glass lens element has an optically effective portion for imaging light to pass therethrough, and the optically effective portion can have an object-side optically effective surface facing toward the object-side and an image-side optically effective surface facing toward the image side. It is noted that a central thickness of a glass lens element refers to an axial distance from an object-side optically effective surface to an image-side optically effective surface of the glass lens element, and an edge thickness of the glass lens element refers to a thickness, in a direction parallel to the optical axis, of a portion of the glass lens element where the glass lens element physically contacts other component(s). Please refer to FIG. 4, which shows a schematic view of PTG and CTG according to the 1st embodiment of the present disclosure. In FIG. 4, the central thickness CTG of the glass lens element GL is the axial distance from the object-side optically effective surface GLF to the image-side optically effective surface GLR of the glass lens element GL, and the edge thickness PTG of the glass lens element GL is the thickness, in the direction parallel to the optical axis OA, of the portion of the glass lens element GL where the glass lens element GL is in physical contact with the first plastic lens element E1.

When a release force required to release the roughened surfaces of the first size reduction portion is Fr1, and a release force required to release the first optically effective portion is Fs1, the following condition can be satisfied: 1.5≤Fr1/Fs1≤25. Therefore, by using the roughened surfaces to increase the release force required to release the plastic lens element from a mold, the removal stability of the plastic lens element from the mold can be improved. Furthermore, by adjusting and controlling the release forces respectively required to release the roughened surfaces and the optically effective portion so as to improve the molding stability of the plastic lens element, the optical image quality of the imaging lens assembly can be more consistent. It is noted that the release force Fr1 required to release the roughened surfaces of the first size reduction portion may refer to a release force Fr1_o required to release the roughened surface of the object-side surface of the first size reduction portion and/or a release force Fr1_i required to release the roughened surface of the image-side surface of the first size reduction portion. Moreover, when the release force required to release the roughened surface of the image-side surface of the first size reduction portion is Fr1_i, and the release force required to release the first optically effective portion is Fs1, the following condition can be satisfied: 5≤Fr1_i/Fs1≤25. Therefore, a relatively large release force on the image side of the roughened surface is favorable for reducing stress accumulation when the lens element is demolded.

When a release force required to release the roughened surfaces of the second size reduction portion is Fr2, and a release force required to release the second optically effective portion is Fs2, the following condition can be satisfied: 1.5≤Fr2/Fs2≤25. Therefore, by using the roughened surfaces to increase the release force required to release the plastic lens element from a mold, the removal stability of the plastic lens element from the mold can be improved. Furthermore, by adjusting and controlling the release forces respectively required to release the roughened surfaces and the optically effective portion so as to improve the molding stability of the plastic lens element, the optical image quality of the imaging lens assembly can be more consistent. It is noted that the release force required to release the roughened surfaces of the second size reduction portion may refer to a release force Fr2_o required to release the roughened surface of the object-side surface of the second size reduction portion and/or a release force Fr2_i required to release the roughened surface of the image-side surface of the second size reduction portion. Moreover, when the release force required to release the roughened surface of the image-side surface of the second size reduction portion is Fr2_i, and the release force required to release the second optically effective portion is Fs2, the following condition can be satisfied: 5≤Fr2_i/Fs2≤25. Therefore, a relatively large release force on the image side of the roughened surface is favorable for reducing stress accumulation when the lens element is demolded.

In one configuration, the roughened surface(s) can be provided with a light absorption layer or an anti-reflection layer, but the present disclosure is not limited thereto.

The first peripheral portion can have a first axial alignment structure, the second peripheral portion can have a second axial alignment structure, and the first axial alignment structure is disposed corresponding to the second axial alignment structure, so that the first plastic lens element and the second plastic lens element are coaxially arranged and aligned with each other. Therefore, it is favorable for increasing the assembly efficiency of the imaging lens assembly and providing better image quality.

The imaging lens assembly can further include a third plastic lens element, the third plastic lens element has a third axial alignment structure, and the third axial alignment structure is disposed corresponding to one of the first axial alignment structure and the second axial alignment structure, so that the first plastic lens element, the second plastic lens element and the third plastic lens element are coaxially arranged and aligned with one another. Therefore, it is favorable for the alignment of multiple lens elements so as to improve assembly stability.

According to the present disclosure, the glass lens element can be disposed on an object side of the first plastic lens element. Therefore, it is favorable for reducing the adverse influence of environmental temperature and humidity changes on the image quality of the imaging lens assembly.

According to the present disclosure, the glass lens element can be disposed on an image side of the second plastic lens element. Therefore, it is favorable for reducing the optical aberrations in the imaging lens assembly.

The roughened surface of the object-side surface of the first size reduction portion is disposed corresponding to the roughened surface of the image-side surface of the first size reduction portion in the direction parallel to the optical axis. Therefore, it is favorable for reducing the possibility of non-imaging light appearing between the lens elements in the imaging lens assembly.

When the total number of lens elements in the imaging lens assembly is N, the following condition can be satisfied: N≥5. Therefore, it is favorable for the imaging lens assembly to be applicable to multiple-lens optical imaging systems so as to provide better optical resolution.

The present disclosure provides a camera module. The camera module includes the aforementioned imaging lens assembly and an image sensor. The image sensor is disposed on an image surface of the imaging lens assembly. The image surface of the imaging lens assembly, based on the corresponding image sensor, can be flat or curved, especially a curved surface being concave facing towards the object side of the imaging lens assembly.

The present disclosure provides an electronic device. The electronic device includes the aforementioned camera module.

According to the present disclosure, the aforementioned features and conditions can be utilized in numerous combinations so as to achieve corresponding effects.

According to the present disclosure, the glass lens element is favorable for the refractive power distribution of the imaging lens assembly to be more flexible, and the influence on imaging caused by external environment temperature change may be reduced. The glass lens element can either be made by grinding or molding. The plastic lens element is favorable for effectively reducing the manufacturing costs. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging lens assembly can therefore be effectively shortened. Additionally, the aspheric surfaces may be formed by plastic injection molding or glass molding. When a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the above description of the present disclosure, the following specific embodiments are provided for further explanation.

1st Embodiment

Figure 2:
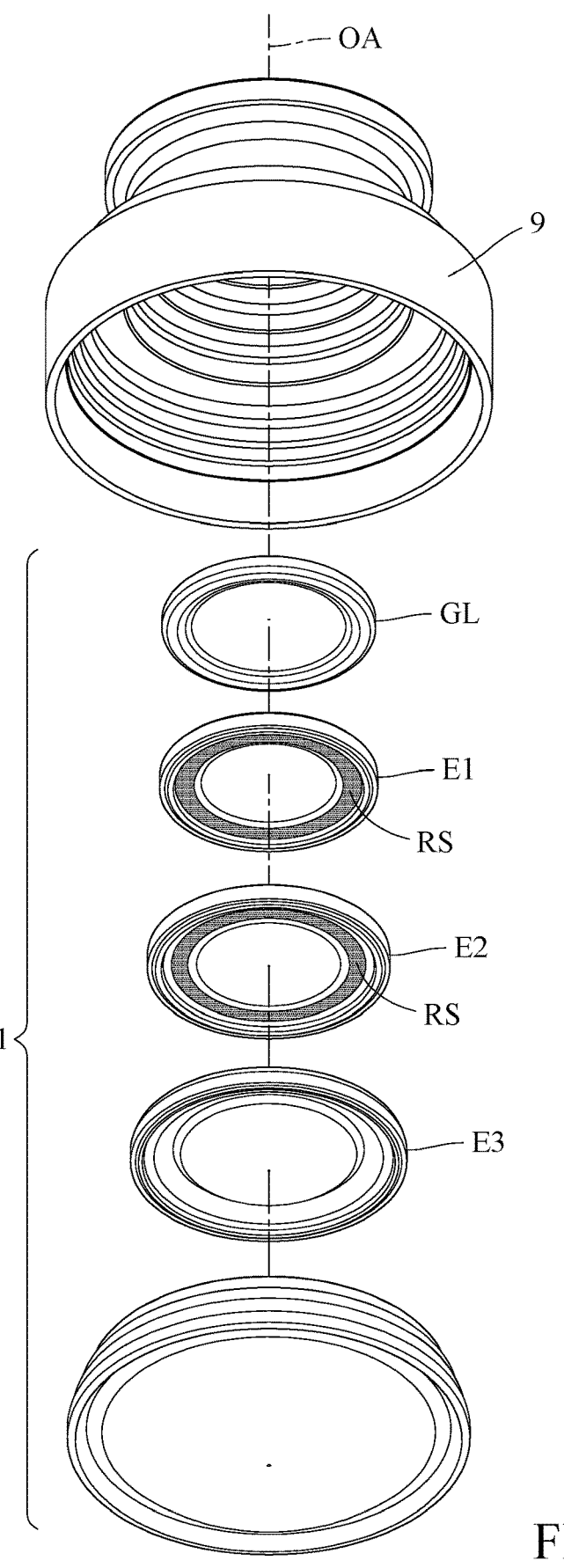
FIG. 2 is another exploded view of the imaging lens assembly and the lens barrel in FIG. 1.
Figure 3:
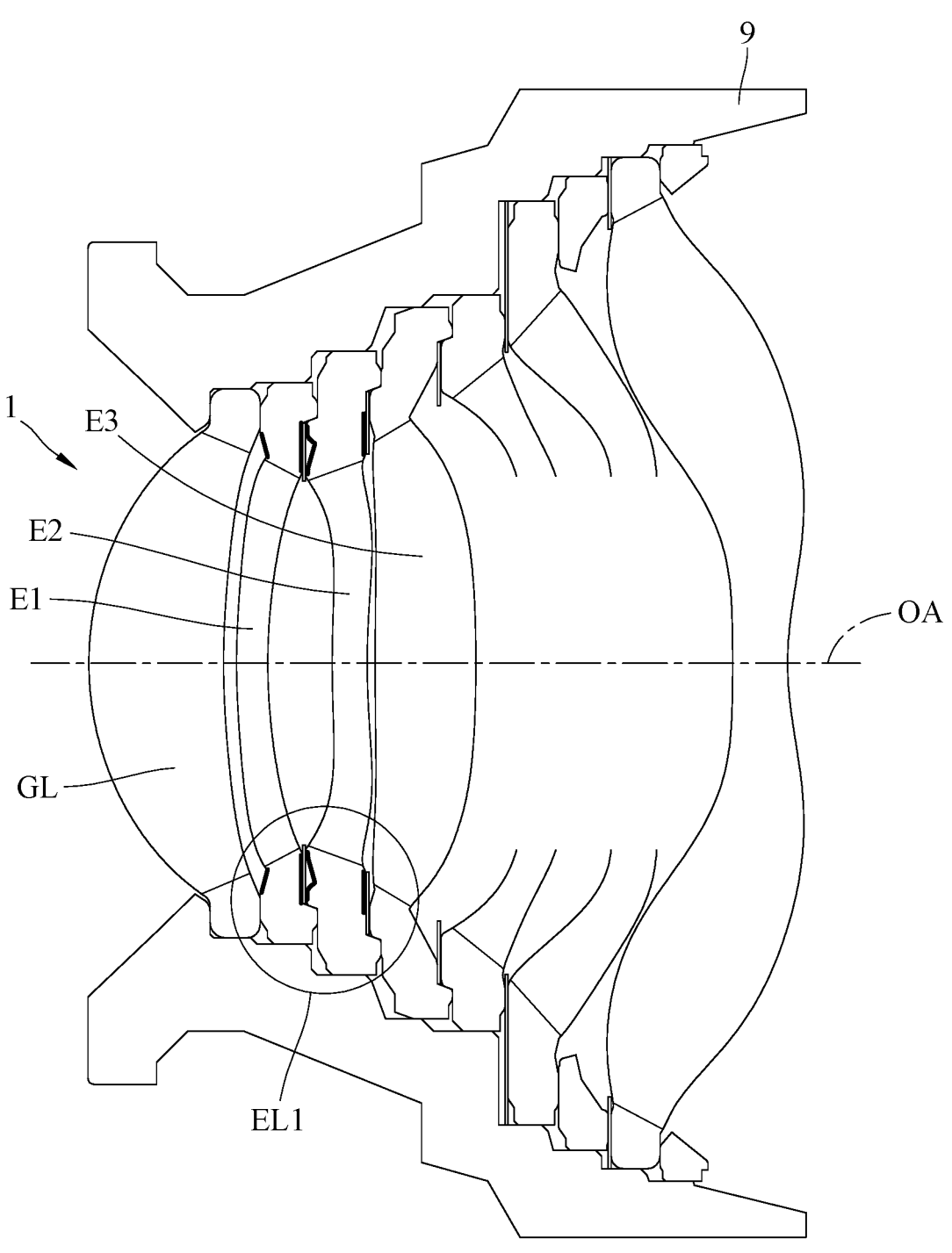
FIG. 3 is a cross-sectional view of the imaging lens assembly and the lens barrel according to the 1st embodiment of the present disclosure.
Figure 5:
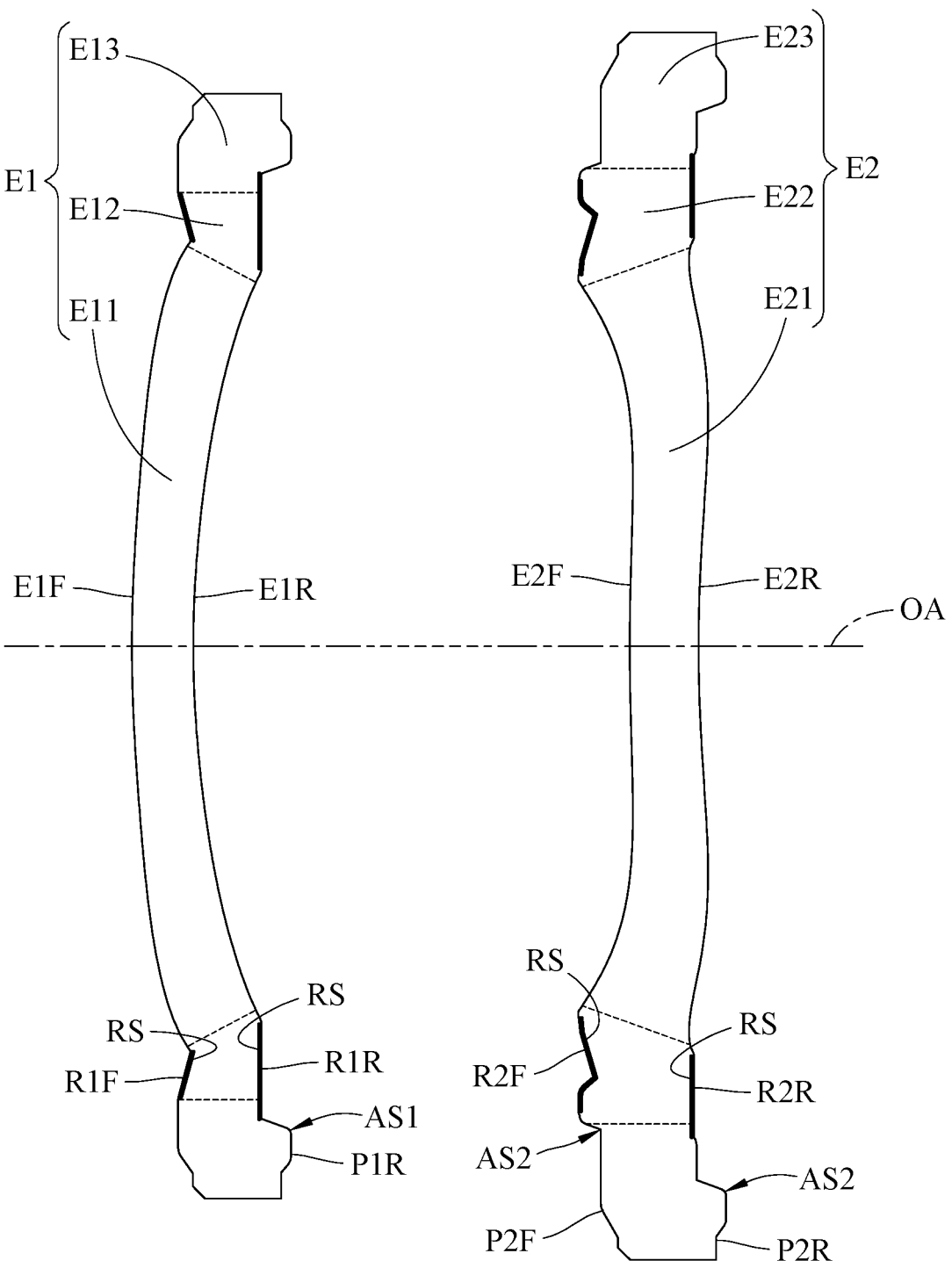
FIG. 5 is an exploded view of the first plastic lens element and the second plastic lens element in FIG. 3.
Figure 6:
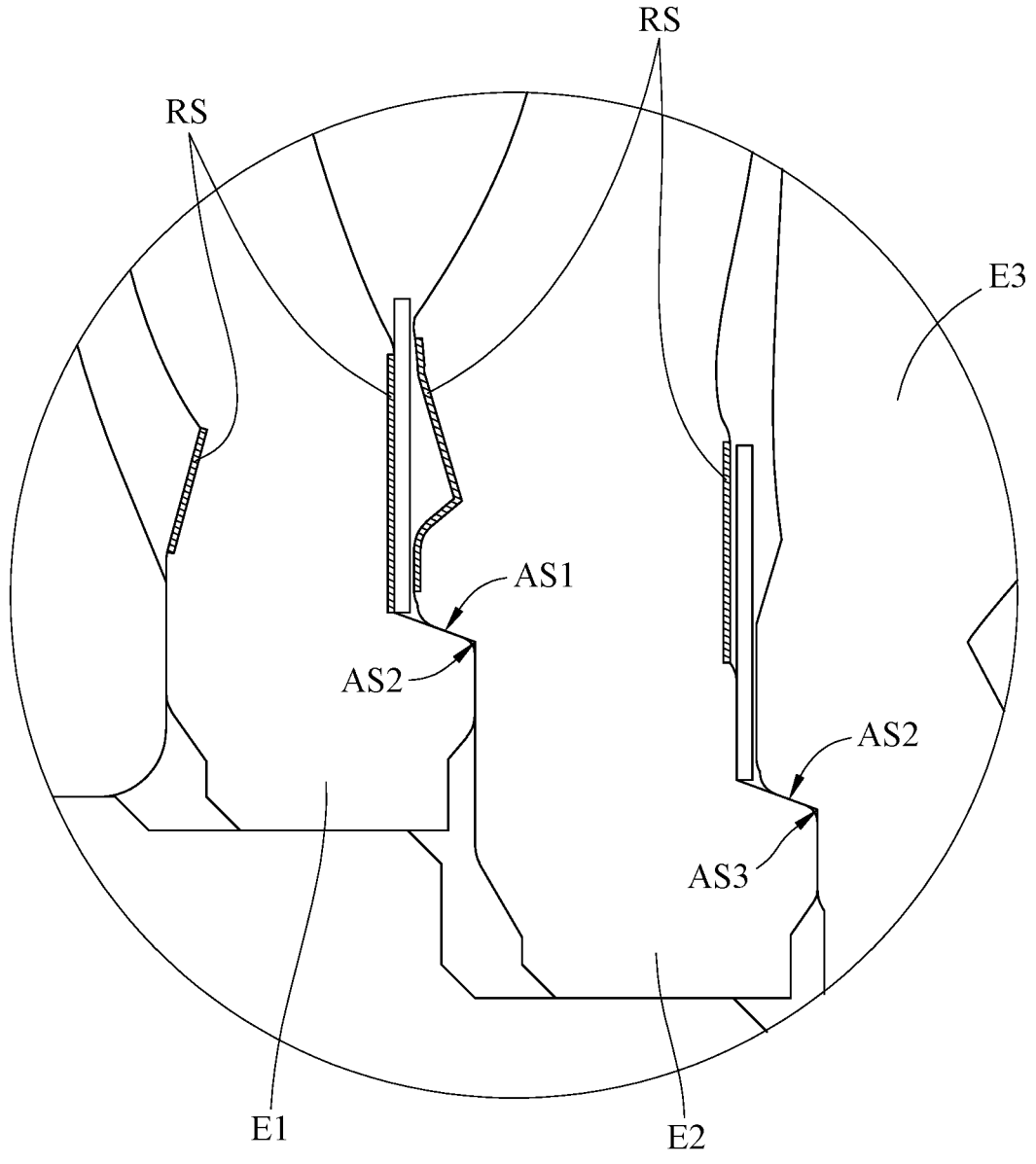
FIG. 6 is an enlarged view of region EL1 in FIG. 3.

FIG. 1 is an exploded view of an imaging lens assembly and a lens barrel according to the 1st embodiment of the present disclosure, FIG. 2 is another exploded view of the imaging lens assembly and the lens barrel in FIG. 1, FIG. 3 is a cross-sectional view of the imaging lens assembly and the lens barrel according to the 1st embodiment of the present disclosure, FIG. 4 is an exploded view of a glass lens element, a first plastic lens element, a second plastic lens element and a third plastic lens element in FIG. 3, FIG. 5 is an exploded view of the first plastic lens element and the second plastic lens element in FIG. 3, and FIG. 6 is an enlarged view of region EL1 in FIG. 3.

The imaging lens assembly 1 is disposed in a lens barrel 9, and the imaging lens assembly 1 includes a plurality of optical elements. The optical elements include a plurality of lens elements and other element(s), such as an aperture, a stop, a light-blocking element, a spacer and a retainer (their reference numerals are omitted), and the present disclosure is not limited thereto. An optical axis OA of the imaging lens assembly 1 passes through the lens elements, and the lens elements includes a glass lens element GL, a first plastic lens element E1, a second plastic lens element E2 and a third plastic lens element E3 arranged along the optical axis OA.

The first plastic lens element E1 includes, in order from a paraxial region thereof to a peripheral region thereof, a first optically effective portion E11, a first size reduction portion E12 and a first peripheral portion E13. The first optically effective portion E11 is configured for imaging light to pass therethrough, and the first optically effective portion E11 has an object-side optically effective surface E1F facing toward an object side and an image-side optically effective surface E1R facing toward an image side. The first size reduction portion E12 is connected and located between the first optically effective portion E11 and the first peripheral portion E13, and each of an object-side surface R1F and an image-side surface R1R of the first size reduction portion E12 has a roughened surface RS. The first peripheral portion E13 is configured to be in physical contact and assembled with adjacent components, and an image-side surface P1R of the first peripheral portion E13 has a first axial alignment structure AS1. In this embodiment, the first peripheral portion E13 is configured to be in physical contact and assembled with a periphery of the glass lens element GL, a second peripheral portion E23 of the second plastic lens element E2 and an inner surface of the lens barrel 9.

The second plastic lens element E2 is disposed on an image side of the first plastic lens element E1, and the second plastic lens element E2 includes, in order from a paraxial region thereof to a peripheral region thereof, a second optically effective portion E21, a second size reduction portion E22 and the second peripheral portion E23. The second optically effective portion E21 is configured for imaging light to pass therethrough, and the second optically effective portion E21 has an object-side optically effective surface E2F facing toward the object side and an image-side optically effective surface E2R facing toward the image side. The second size reduction portion E22 is connected and located between the second optically effective portion E21 and the second peripheral portion E23, and each of an object-side surface R2F and an image-side surface R2R of the second size reduction portion E22 has a roughened surface RS. The second peripheral portion E23 is configured to be in physical contact and assembled with adjacent components, and each of an object-side surface P2F and an image-side surface P2R of the second peripheral portion E23 has a second axial alignment structure AS2. In this embodiment, the second peripheral portion E23 is configured to be in physical contact and assembled with the first peripheral portion E13 of the first plastic lens element E1, a periphery of the third plastic lens element E3 and the inner surface of the lens barrel 9.

The third plastic lens element E3 is disposed corresponding to the second plastic lens element E2, and the third plastic lens element E3 is disposed on an image side of the second plastic lens element E2. The third plastic lens element E3 has a third axial alignment structure AS3 at a peripheral object-side surface P3F thereof.

The glass lens element GL is disposed corresponding to the first plastic lens element E1, and the glass lens element GL is disposed on an object side of the first plastic lens element E1. The glass lens element GL has an optically effective portion GLE configured for imaging light to pass therethrough, and the optically effective portion GLE has an object-side optically effective surface GLF facing toward the object side and an image-side optically effective surface GLR facing toward the image side.

In this embodiment, the first axial alignment structure AS1 of the image-side surface P1R of the first peripheral portion E13 is disposed corresponding to the second axial alignment structure AS2 of the object-side surface P2F of the second peripheral portion E23, so that the first plastic lens element E1 and the second plastic lens element E2 are coaxially arranged and aligned with each other. In addition, the third axial alignment structure AS3 of the third plastic lens element E3 is disposed corresponding to the second axial alignment structure AS2 of the image-side surface P2R of the second peripheral portion E23, so that the first plastic lens element E1, the second plastic lens element E2 and the third plastic lens element E3 are coaxially arranged and aligned with one another.

The roughened surface RS of the object-side surface R1F of the first size reduction portion E12 is disposed corresponding to the roughened surface RS of the image-side surface R1R of the first size reduction portion E12 in a direction parallel to the optical axis OA.

In this embodiment, each of the roughened surfaces RS of the first size reduction portion E12 and the second size reduction portion E22 has a white foggy appearance. In addition, each of the roughened surfaces RS can be provided with a light absorption layer or an anti-reflection layer, but the present disclosure is not limited thereto.

When a central thickness of the first optically effective portion E11 is CT1, the following condition is satisfied: CT1=0.25 mm.

When a central thickness of the second optically effective portion E21 is CT2, the following condition is satisfied: CT2=0.28 mm.

When a minimum thickness of the first size reduction portion E12 is ET1m, and a peripheral thickness of the first optically effective portion E11 is ET1, the following conditions are satisfied: ET1m=0.289 mm; ET1=0.316 mm; and ET1m/ET1=0.915.

When a minimum thickness of the second size reduction portion E22 is ET2m, and a peripheral thickness of the second optically effective portion E21 is ET2, the following conditions are satisfied: ET2m=0.411 mm; ET2=0.467 mm; and ET2m/ET2=0.880.

When an edge thickness of the glass lens element GL is PTG, and a central thickness of the glass lens element GL is CTG, the following conditions are satisfied: PTG=0.4 mm; CTG=1.078 mm; and PTG/CTG=0.371.

A release force required to release any roughened surface RS of the first size reduction portion E12 can be denoted by Fr1. When a release force required to release the roughened surface RS of the object-side surface R1F of the first size reduction portion E12 is Fr1_o, a release force required to release the roughened surface RS of the image-side surface R1R of the first size reduction portion E12 is Fr1_i, and a release force required to release the first optically effective portion E11 is Fs1, the following conditions are satisfied: Fr1_o/Fs1=6.5; and Fr1_i/Fs1=9.3.

A release force required to release any roughened surface RS of the second size reduction portion E22 can be denoted by Fr2. When a release force required to release the roughened surface RS of the object-side surface R2F of the second size reduction portion E22 is Fr2_o, a release force required to release the roughened surface RS of the image-side surface R2R of the second size reduction portion E22 is Fr2_i, and a release force required to release the second optically effective portion E21 is Fs2, the following conditions are satisfied: Fr2_o/Fs2=6.6; and Fr2_i/Fs2=16.0.

When the total number of lens elements in the imaging lens assembly 1 is N, the following condition is satisfied: N=7.

2nd Embodiment

Figure 7:
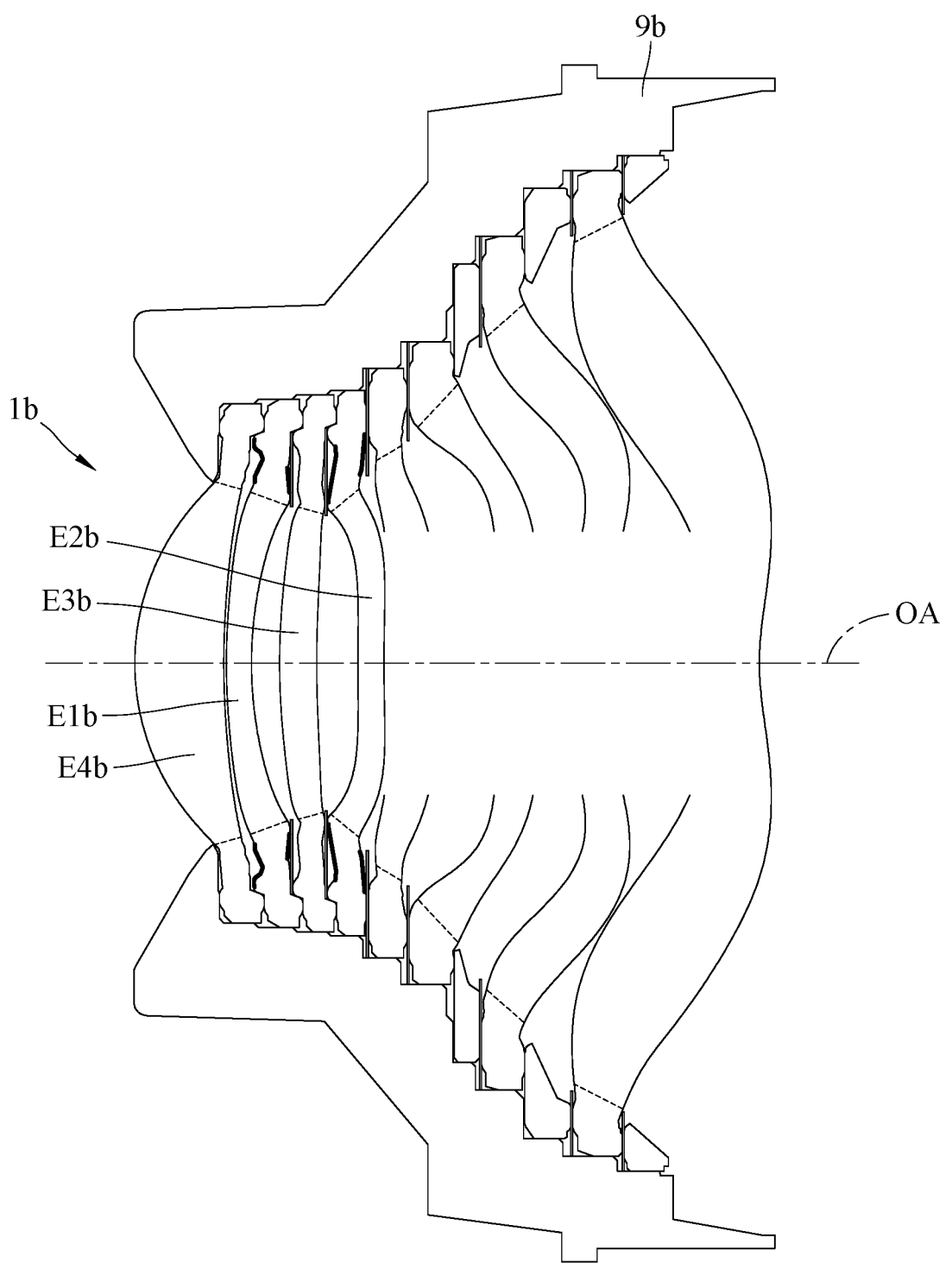
FIG. 7 is a cross-sectional view of an imaging lens assembly and a lens barrel according to the 2nd embodiment of the present disclosure.
Figure 8:
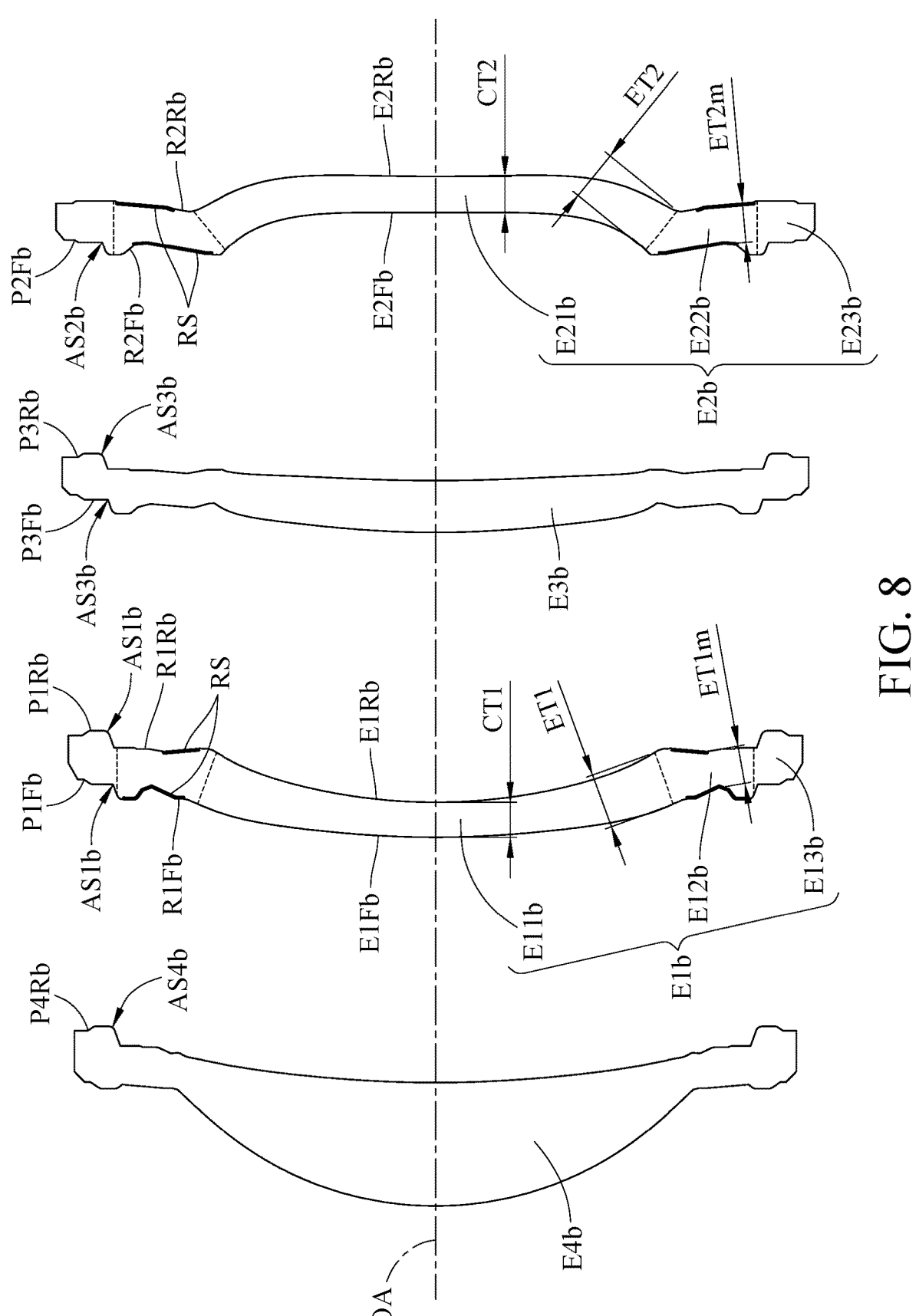
FIG. 8 is an exploded view of a fourth plastic lens element, a first plastic lens element, a third plastic lens element and a second plastic lens element in FIG. 7.

FIG. 7 is a cross-sectional view of an imaging lens assembly and a lens barrel according to the 2nd embodiment of the present disclosure, and FIG. 8 is an exploded view of a fourth plastic lens element, a first plastic lens element, a third plastic lens element and a second plastic lens element in FIG. 7.

The imaging lens assembly 1b is disposed in a lens barrel 9b, and the imaging lens assembly 1b includes a plurality of optical elements. The optical elements include a plurality of lens elements and other element(s), such as an aperture, a stop, a light-blocking element, a spacer and a retainer (their reference numerals are omitted), and the present disclosure is not limited thereto. An optical axis OA of the imaging lens assembly 1b passes through the lens elements, and the lens elements includes a fourth plastic lens element E4b, a first plastic lens element E1b, a third plastic lens element E3b and a second plastic lens element E2b arranged along the optical axis OA.

The first plastic lens element E1b includes, in order from a paraxial region thereof to a peripheral region thereof, a first optically effective portion E11b, a first size reduction portion E12b and a first peripheral portion E13b. The first optically effective portion E11b is configured for imaging light to pass therethrough, and the first optically effective portion E11b has an object-side optically effective surface E1Fb facing toward an object side and an image-side optically effective surface E1Rb facing toward an image side. The first size reduction portion E12b is connected and located between the first optically effective portion E11b and the first peripheral portion E13b, and each of an object-side surface R1Fb and an image-side surface R1Rb of the first size reduction portion E12b has a roughened surface RS. The first peripheral portion E13b is configured to be in physical contact and assembled with adjacent components, and each of an object-side surface P1Fb and an image-side surface P1Rb of the first peripheral portion E13b has a first axial alignment structure AS1b. In this embodiment, the first peripheral portion E13b is configured to be in physical contact and assembled with a periphery of the fourth plastic lens element E4b, a periphery of the third plastic lens element E3b and an inner surface of the lens barrel 9b.

The second plastic lens element E2b is disposed on an image side of the first plastic lens element E1b, and the second plastic lens element E2b includes, in order from a paraxial region thereof to a peripheral region thereof, a second optically effective portion E21b, a second size reduction portion E22b and a second peripheral portion E23b. The second optically effective portion E21b is configured for imaging light to pass therethrough, and the second optically effective portion E21b has an object-side optically effective surface E2Fb facing toward the object side and an image-side optically effective surface E2Rb facing toward the image side. The second size reduction portion E22b is connected and located between the second optically effective portion E21b and the second peripheral portion E23b, and each of an object-side surface R2Fb and an image-side surface R2Rb of the second size reduction portion E22b has a roughened surface RS. The second peripheral portion E23b is configured to be in physical contact and assembled with adjacent components, and an object-side surface P2Fb of the second peripheral portion E23b has a second axial alignment structure AS2b. In this embodiment, the second peripheral portion E23b is configured to be in physical contact and assembled with the periphery of the third plastic lens element E3b and the inner surface of the lens barrel 9b.

The third plastic lens element E3b is disposed corresponding to both of the first plastic lens element E1b and the second plastic lens element E2b, and the third plastic lens element E3b is disposed between the first plastic lens element E1b and the second plastic lens element E2b. The third plastic lens element E3b has a third axial alignment structure AS3b at a peripheral object-side surface P3Fb thereof and a third axial alignment structure AS3b at a peripheral image-side surface P3Rb thereof.

The fourth plastic lens element E4b is disposed corresponding to the first plastic lens element E1b, and the fourth plastic lens element E4b is disposed on an object side of the first plastic lens element E1b. The fourth plastic lens element E4b has a fourth axial alignment structure AS4b at a peripheral image-side surface P4Rb thereof.

In this embodiment, the third axial alignment structures AS3b of the third plastic lens element E3b are respectively disposed corresponding to the first axial alignment structure AS1b of the image-side surface P1Rb of the first peripheral portion E13b and the second axial alignment structure AS2b of the object-side surface P2Fb of the second peripheral portion E23b, so that the first plastic lens element E1b, the second plastic lens element E2b and the third plastic lens element E3b are coaxially arranged and aligned with one another. In addition, the fourth axial alignment structure AS4b of the fourth plastic lens element E4b is disposed corresponding to the first axial alignment structure AS1b of the object-side surface P1Fb of the first peripheral portion E13b, so that the first plastic lens element E1b, the second plastic lens element E2b, the third plastic lens element E3b and the fourth plastic lens element E4b are coaxially arranged and aligned with one another.

The roughened surface RS of the object-side surface R1Fb of the first size reduction portion E12b is disposed corresponding to the roughened surface RS of the image-side surface R1Rb of the first size reduction portion E12b in a direction parallel to the optical axis OA.

In this embodiment, each of the roughened surfaces RS of the first size reduction portion E12b and the second size reduction portion E22b has a white foggy appearance. In addition, each of the roughened surfaces RS can be provided with a light absorption layer or an anti-reflection layer, but the present disclosure is not limited thereto.

When a central thickness of the first optically effective portion E11b is CT1, the following condition is satisfied: $CT1=0.285$ mm.

When a central thickness of the second optically effective portion E21b is CT2, the following condition is satisfied: $CT2=0.295$ mm.

When a minimum thickness of the first size reduction portion E12b is ET1m, and a peripheral thickness of the first optically effective portion E11b is ET1, the following conditions are satisfied: $ET1m=0.309$ mm; $ET1=0.448$ mm; and $ET1m/ET1=0.690$.

When a minimum thickness of the second size reduction portion E22b is ET2m, and a peripheral thickness of the second optically effective portion E21b is ET2, the following conditions are satisfied: $ET2m=0.321$ mm; $ET2=0.415$ mm; and $ET2m/ET2=0.773$.

A release force required to release any roughened surface RS of the first size reduction portion E12b can be denoted by Fr1. When a release force required to release the roughened surface RS of the object-side surface R1Fb of the first size reduction portion E12b is Fr1_o, a release force required to release the roughened surface RS of the image-side surface R1Rb of the first size reduction portion E12b is Fr1_i, and a release force required to release the first optically effective portion E11b is Fs1, the following conditions are satisfied: $Fr1\_o/Fs1=3.1$; and $Fr1\_i/Fs1=5.2$.

A release force required to release any roughened surface RS of the second size reduction portion E22b can be denoted by Fr2. When a release force required to release the roughened surface RS of the object-side surface R2Fb of the second size reduction portion E22b is Fr2_o, a release force required to release the roughened surface RS of the image-side surface R2Rb of the second size reduction portion E22b is Fr2_i, and a release force required to release the second optically effective portion E21b is Fs2, the following conditions are satisfied: Fr2_o/Fs2=6.6; and Fr2_i/Fs2=7.7.

When the number of lens elements in the imaging lens assembly 1b is N, the following condition is satisfied: N=8.

3rd Embodiment

Figure 9:
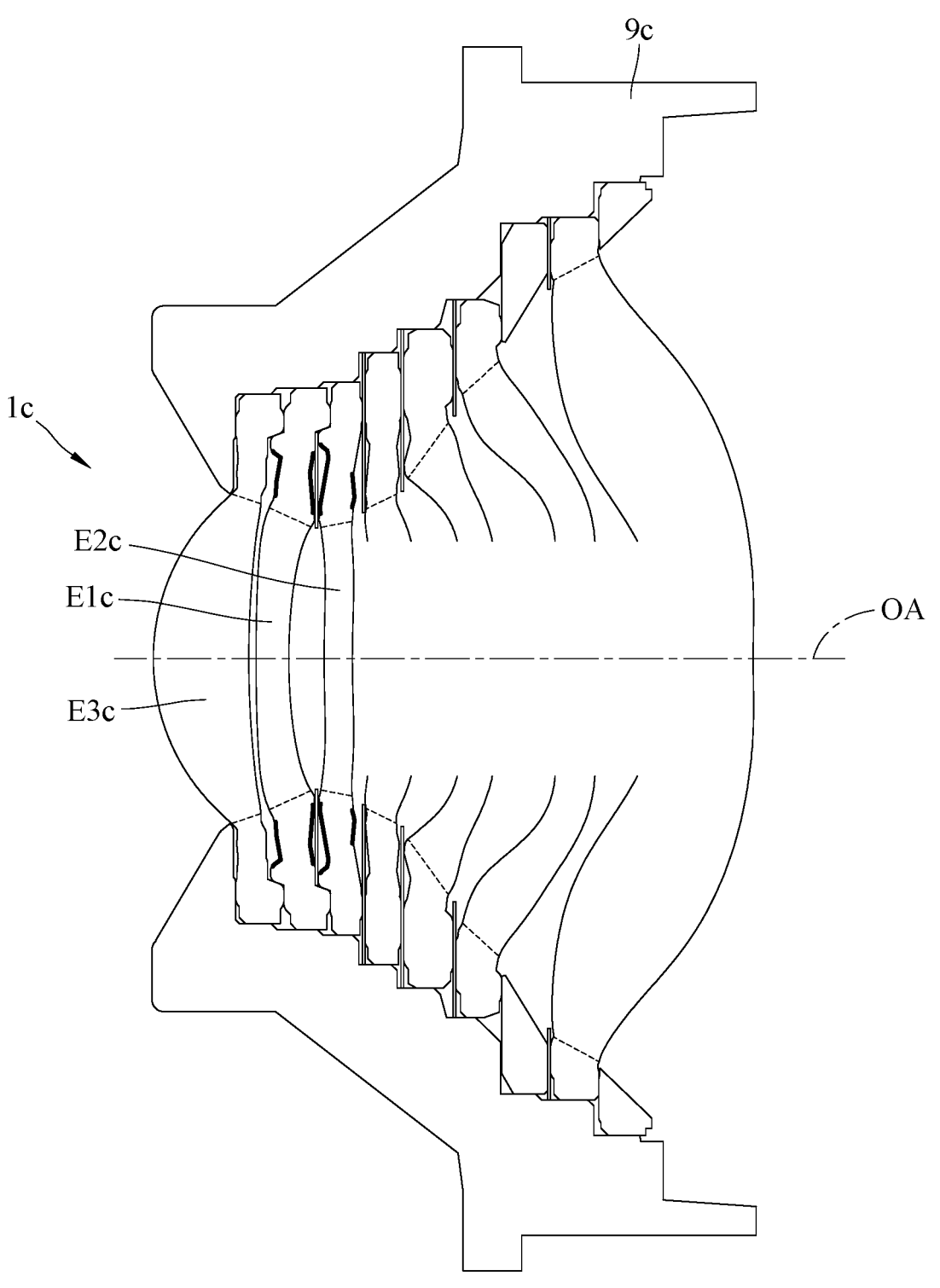
FIG. 9 is a cross-sectional view of an imaging lens assembly and a lens barrel according to the 3rd embodiment of the present disclosure.
Figure 10:
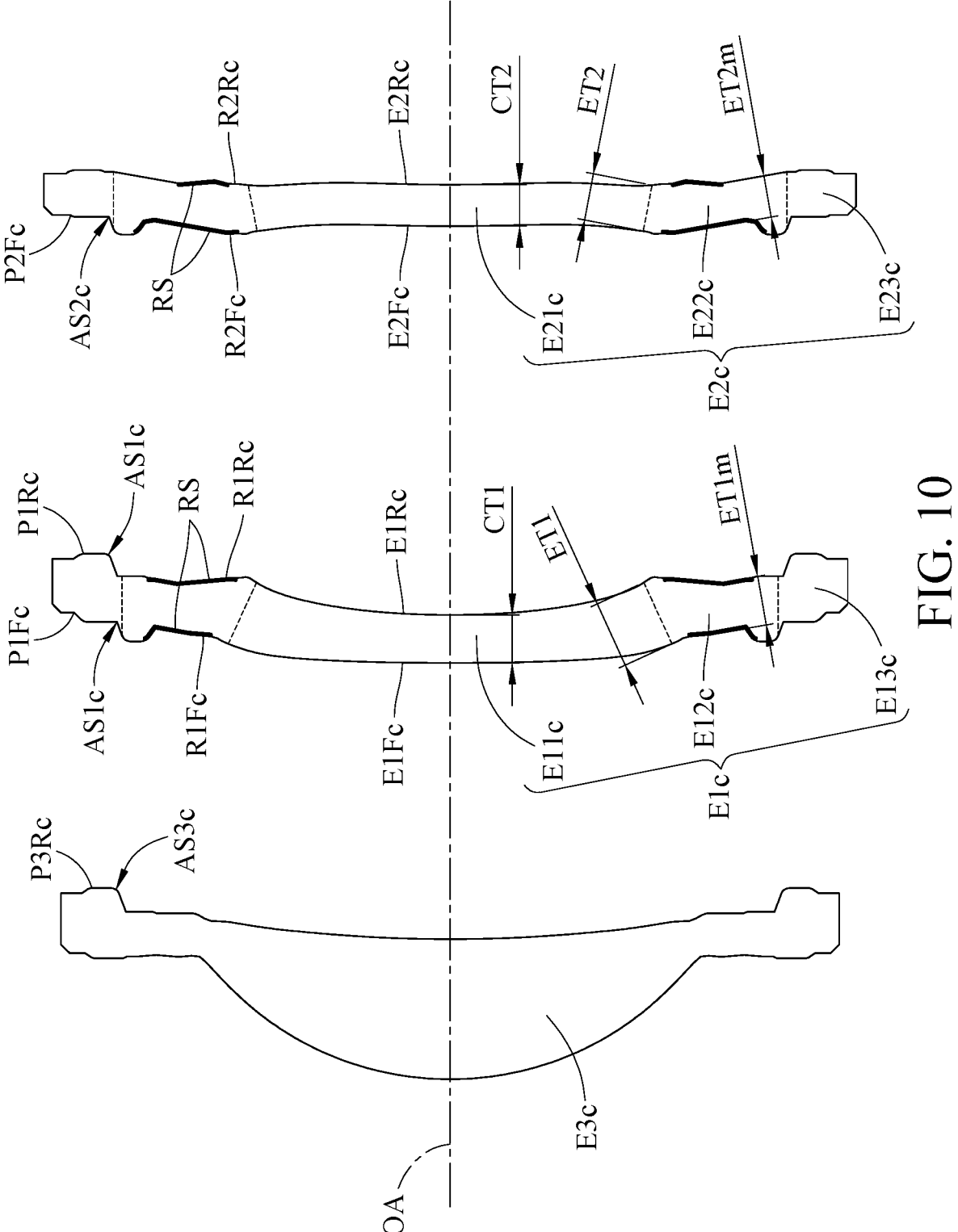
FIG. 10 is an exploded view of a third plastic lens element, a first plastic lens element and a second plastic lens element in FIG. 9.

FIG. 9 is a cross-sectional view of an imaging lens assembly and a lens barrel according to the 3rd embodiment of the present disclosure, and FIG. 10 is an exploded view of a third plastic lens element, a first plastic lens element and a second plastic lens element in FIG. 9.

The imaging lens assembly 1c is disposed in a lens barrel 9c, and the imaging lens assembly 1c includes a plurality of optical elements. The optical elements include a plurality of lens elements and other element(s), such as an aperture, a stop, a light-blocking element, a spacer and a retainer (their reference numerals are omitted), and the present disclosure is not limited thereto. An optical axis OA of the imaging lens assembly 1c passes through the lens elements, and the lens elements includes a third plastic lens element E3c, a first plastic lens element E1c and a second plastic lens element E2c arranged along the optical axis OA.

The first plastic lens element E1c includes, in order from a paraxial region thereof to a peripheral region thereof, a first optically effective portion E11c, a first size reduction portion E12c and a first peripheral portion E13c. The first optically effective portion E11c is configured for imaging light to pass therethrough, and the first optically effective portion E11c has an object-side optically effective surface E1Fc facing toward an object side and an image-side optically effective surface E1Rc facing toward an image side. The first size reduction portion E12c is connected and located between the first optically effective portion E11c and the first peripheral portion E13c, and each of an object-side surface R1Fc and an image-side surface R1Rc of the first size reduction portion E12c has a roughened surface RS. The first peripheral portion E13c is configured to be in physical contact and assembled with adjacent components, and each of an object-side surface P1Fc and an image-side surface P1Rc of the first peripheral portion E13c has a first axial alignment structure AS1c. In this embodiment, the first peripheral portion E13c is configured to be in physical contact and assembled with a periphery of the third plastic lens element E3c, a second peripheral portion E23c of the second plastic lens element E2c and an inner surface of the lens barrel 9c.

The second plastic lens element E2c is disposed on an image side of the first plastic lens element E1c, and the second plastic lens element E2c includes, in order from a paraxial region thereof to a peripheral region thereof, a second optically effective portion E21c, a second size reduction portion E22c and the second peripheral portion E23c. The second optically effective portion E21c is configured for imaging light to pass therethrough, and the second optically effective portion E21c has an object-side optically effective surface E2Fc facing toward the object side and an image-side optically effective surface E2Rc facing toward the image side. The second size reduction portion E22c is connected and located between the second optically effective portion E21c and the second peripheral portion E23c, and each of an object-side surface R2Fc and an image-side surface R2Rc of the second size reduction portion E22c has a roughened surface RS. The second peripheral portion E23c is configured to be in physical contact and assembled with adjacent components, and an object-side surface P2Fc of the second peripheral portion E23c has a second axial alignment structure AS2c. In this embodiment, the second peripheral portion E23c is configured to be in physical contact and assembled with the first peripheral portion E13c of the first plastic lens element E1c and the inner surface of the lens barrel 9c.

The third plastic lens element E3c is disposed corresponding to the first plastic lens element E1c, and the third plastic lens element E3c is disposed on an object side of the first plastic lens element E1c. The third plastic lens element E3c has a third axial alignment structure AS3c at a peripheral image-side surface P3Rc thereof.

In this embodiment, the first axial alignment structure AS1c of the image-side surface P1Rc of the first peripheral portion E13c is disposed corresponding to the second axial alignment structure AS2c of the object-side surface P2Fc of the second peripheral portion E23c, so that the first plastic lens element E1c and the second plastic lens element E2c are coaxially arranged and aligned with each other. In addition, the third axial alignment structure AS3c of the third plastic lens element E3c is disposed corresponding to the first axial alignment structure AS1c of the object-side surface P1Fc of the first peripheral portion E13c, so that the first plastic lens element E1c, the second plastic lens element E2c and the third plastic lens element E3c are coaxially arranged and aligned with one another.

The roughened surface RS of the object-side surface R1Fc of the first size reduction portion E12c is disposed corresponding to the roughened surface RS of the image-side surface R1Rc of the first size reduction portion E12c in a direction parallel to the optical axis OA.

In this embodiment, each of the roughened surfaces RS of the first size reduction portion E12c and the second size reduction portion E22c has a white foggy appearance. In addition, each of the roughened surfaces RS can be provided with a light absorption layer or an anti-reflection layer, but the present disclosure is not limited thereto.

When a central thickness of the first optically effective portion E11c is CT1, the following condition is satisfied: CT1=0.278 mm.

When a central thickness of the second optically effective portion E21c is CT2, the following condition is satisfied: CT2=0.24 mm.

When a minimum thickness of the first size reduction portion E12c is ET1m, and a peripheral thickness of the first optically effective portion E11c is ET1, the following conditions are satisfied: ET1m=0.286 mm; ET1=0.39 mm; and ET1m/ET1=0.733.

When a minimum thickness of the second size reduction portion E22c is ET2m, and a peripheral thickness of the second optically effective portion E21c is ET2, the following conditions are satisfied: ET2m=0.243 mm; ET2=0.272 mm; and ET2m/ET2=0.893.

A release force required to release any roughened surface RS of the first size reduction portion E12c can be denoted by Fr1. When a release force required to release the roughened surface RS of the object-side surface R1Fc of the first size reduction portion E12c is Fr1_o, a release force required to release the roughened surface RS of the image-side surface R1Rc of the first size reduction portion E12c is Fr1_i, and a release force required to release the first optically effective portion E11c is Fs1, the following conditions are satisfied: Fr1_o/Fs1=4.7; and Fr1_i/Fs1=19.4.

A release force required to release any roughened surface RS of the second size reduction portion E22c can be denoted by Fr2. When a release force required to release the roughened surface RS of the object-side surface R2Fc of the second size reduction portion E22c is Fr2_o, a release force required to release the roughened surface RS of the image-side surface R2Rc of the second size reduction portion E22c is Fr2_i, and a release force required to release the second optically effective portion E21c is Fs2, the following conditions are satisfied: Fr2_o/Fs2=7.2; and Fr2_i/Fs2=9.3.

When the number of lens elements in the imaging lens assembly 1c is N, the following condition is satisfied: N=7.

4th Embodiment

Figure 11:
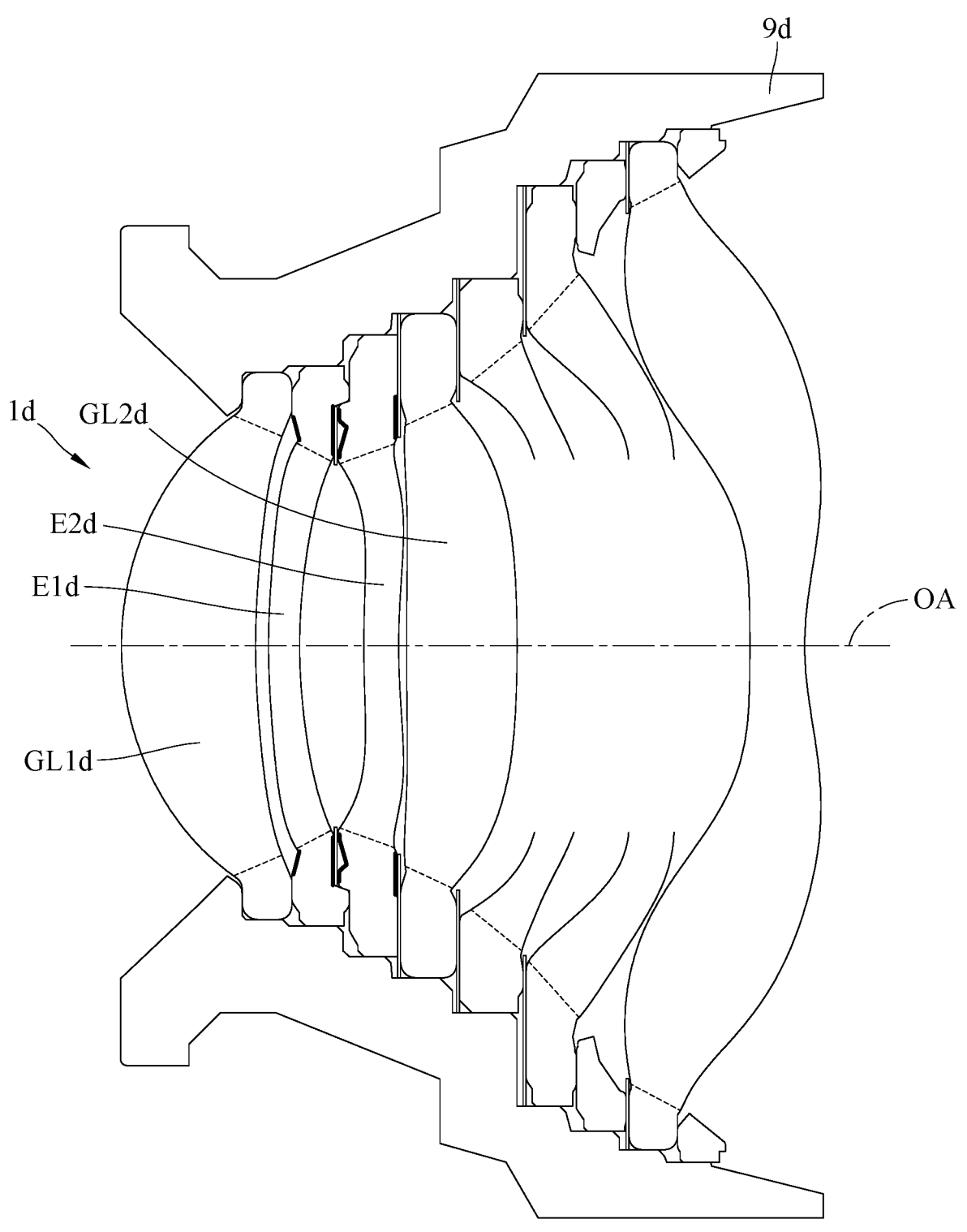
FIG. 11 is a cross-sectional view of an imaging lens assembly and a lens barrel according to the 4th embodiment of the present disclosure.
Figure 12:
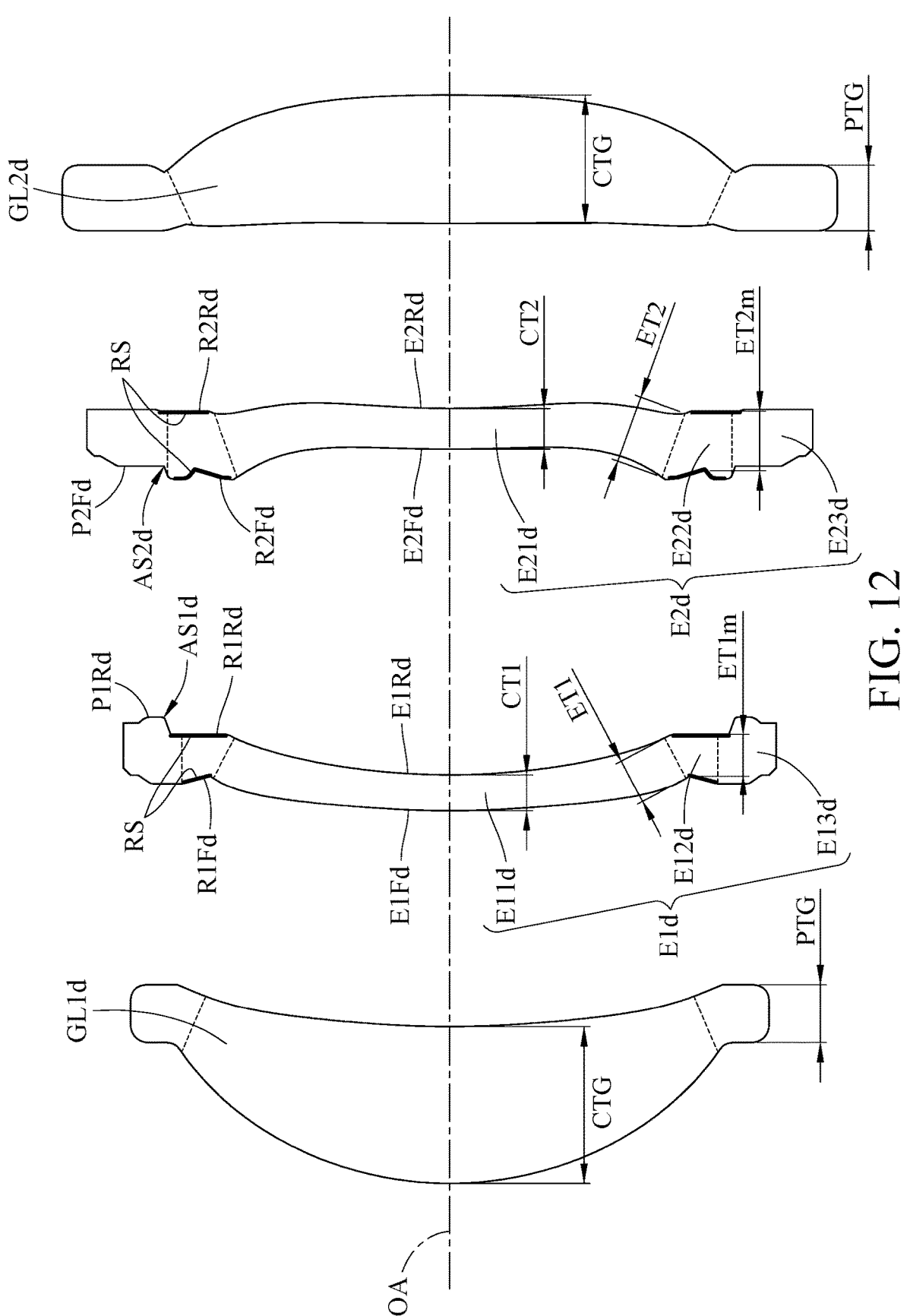
FIG. 12 is an exploded view of a first glass lens element, a first plastic lens element, a second plastic lens element and a second glass lens element in FIG. 11.

FIG. 11 is a cross-sectional view of an imaging lens assembly and a lens barrel according to the 4th embodiment of the present disclosure, and FIG. 12 is an exploded view of a first glass lens element, a first plastic lens element, a second plastic lens element and a second glass lens element in FIG. 11.

The imaging lens assembly 1d is disposed in a lens barrel 9d, and the imaging lens assembly 1d includes a plurality of optical elements. The optical elements include a plurality of lens elements and other element(s), such as an aperture, a stop, a light-blocking element, a spacer and a retainer (their reference numerals are omitted), and the present disclosure is not limited thereto. An optical axis OA of the imaging lens assembly 1d passes through the lens elements, and the lens elements includes a first glass lens element GL1d, a first plastic lens element E1d, a second plastic lens element E2d and a second glass lens element GL2d arranged along the optical axis OA.

The first plastic lens element E1d includes, in order from a paraxial region thereof to a peripheral region thereof, a first optically effective portion E11d, a first size reduction portion E12d and a first peripheral portion E13d. The first optically effective portion E11d is configured for imaging light to pass therethrough, and the first optically effective portion E11d has an object-side optically effective surface E1Fd facing toward an object side and an image-side optically effective surface E1Rd facing toward an image side. The first size reduction portion E12d is connected and located between the first optically effective portion E11d and the first peripheral portion E13d, and each of an object-side surface R1Fd and an image-side surface R1Rd of the first size reduction portion E12d has a roughened surface RS. The first peripheral portion E13d is configured to be in physical contact and assembled with adjacent components, and an image-side surface P1Rd of the first peripheral portion E13d has a first axial alignment structure AS1d. In this embodiment, the first peripheral portion E13d is configured to be in physical contact and assembled with a second peripheral portion E23d of the second plastic lens element E2d and an inner surface of the lens barrel 9d.

The second plastic lens element E2d is disposed on an image side of the first plastic lens element E1d, and the second plastic lens element E2d includes, in order from a paraxial region thereof to a peripheral region thereof, a second optically effective portion E21d, a second size reduction portion E22d and the second peripheral portion E23d. The second optically effective portion E21d is configured for imaging light to pass therethrough, and the second optically effective portion E21d has an object-side optically effective surface E2Fd facing toward the object side and an image-side optically effective surface E2Rd facing toward the image side. The second size reduction portion E22d is connected and located between the second optically effective portion E21d and the second peripheral portion E23d, and each of an object-side surface R2Fd and an image-side surface R2Rd of the second size reduction portion E22d has a roughened surface RS. The second peripheral portion E23d is configured to be in physical contact and assembled with adjacent components, and an object-side surface P2Fd of the second peripheral portion E23d has a second axial alignment structure AS2d. In this embodiment, the second peripheral portion E23d is configured to be in physical contact and assembled with the first peripheral portion E13d of the first plastic lens element E1d and the inner surface of the lens barrel 9d.

The first glass lens element GL1d is disposed corresponding to the first plastic lens element E1d, and the first glass lens element GL1d is disposed on an object side of the first plastic lens element E1d. The first glass lens element GL1d has an optically effective portion configured for imaging light to pass therethrough, and the optically effective portion has an object-side optically effective surface facing toward the object side and an image-side optically effective surface facing toward the image side.

The second glass lens element GL2d is disposed corresponding to the second plastic lens element E2d, and the second glass lens element GL2d is disposed on an image side of the second plastic lens element E2d. The second glass lens element GL2d has an optically effective portion configured for imaging light to pass therethrough, and the optically effective portion has an object-side optically effective surface facing toward the object side and an image-side optically effective surface facing toward the image side.

In this embodiment, the first axial alignment structure AS1d of the image-side surface P1Rd of the first peripheral portion E13d is disposed corresponding to the second axial alignment structure AS2d of the object-side surface P2Fd of the second peripheral portion E23d, so that the first plastic lens element E1d and the second plastic lens element E2d are coaxially arranged and aligned with each other.

The roughened surface RS of the object-side surface R1Fd of the first size reduction portion E12d is disposed corresponding to the roughened surface RS of the image-side surface R1Rd of the first size reduction portion E12d in a direction parallel to the optical axis OA.

In this embodiment, each of the roughened surfaces RS of the first size reduction portion E12d and the second size reduction portion E22d has a white foggy appearance. In addition, each of the roughened surfaces RS can be provided with a light absorption layer or an anti-reflection layer, but the present disclosure is not limited thereto.

When a central thickness of the first optically effective portion E11d is CT1, the following condition is satisfied: CT1=0.25 mm.

When a central thickness of the second optically effective portion E21d is CT2, the following condition is satisfied: CT2=0.28 mm.

When a minimum thickness of the first size reduction portion E12d is ET1m, and a peripheral thickness of the first optically effective portion E11d is ET1, the following conditions are satisfied: ET1m=0.289 mm; ET1=0.316 mm; and ET1m/ET1=0.915.

When a minimum thickness of the second size reduction portion E22d is ET2m, and a peripheral thickness of the second optically effective portion E21d is ET2, the following conditions are satisfied: ET2m=0.411 mm; ET2=0.467 mm; and ET2m/ET2=0.880.

When an edge thickness of the first glass lens element GL1d is PTG, and a central thickness of the first glass lens element GL1d is CTG, the following conditions are satisfied: PTG=0.4 mm; CTG=1.078 mm; and PTG/CTG=0.371.

When an edge thickness of the second glass lens element GL2d is PTG, and a central thickness of the second glass lens element GL2d is CTG, the following conditions are satisfied: PTG=0.45 mm; CTG=0.887 mm; and PTG/CTG=0.507.

A release force required to release any roughened surface RS of the first size reduction portion E12d can be denoted by Fr1. When a release force required to release the roughened surface RS of the object-side surface R1Fd of the first size reduction portion E12d is Fr1_o, a release force required to release the roughened surface RS of the image-side surface R1Rd of the first size reduction portion E12d is and a release force required to release the first optically effective portion E11d is Fs1, the following conditions are satisfied: Fr1_o/Fs1=7.7; and Fr1_i/Fs1=16.0.

A release force required to release any roughened surface RS of the second size reduction portion E22d can be denoted by Fr2. When a release force required to release the roughened surface RS of the object-side surface R2Fd of the second size reduction portion E22d is Fr2_o, a release force required to release the roughened surface RS of the image-side surface R2Rd of the second size reduction portion E22d is Fr2_i, and a release force required to release the second optically effective portion E21d is Fs2, the following conditions are satisfied: Fr2_o/Fs2=2.8; and Fr2_i/Fs2=9.3.

When the number of lens elements in the imaging lens assembly 1d is N, the following condition is satisfied: N=7.

5th Embodiment

Figure 13:
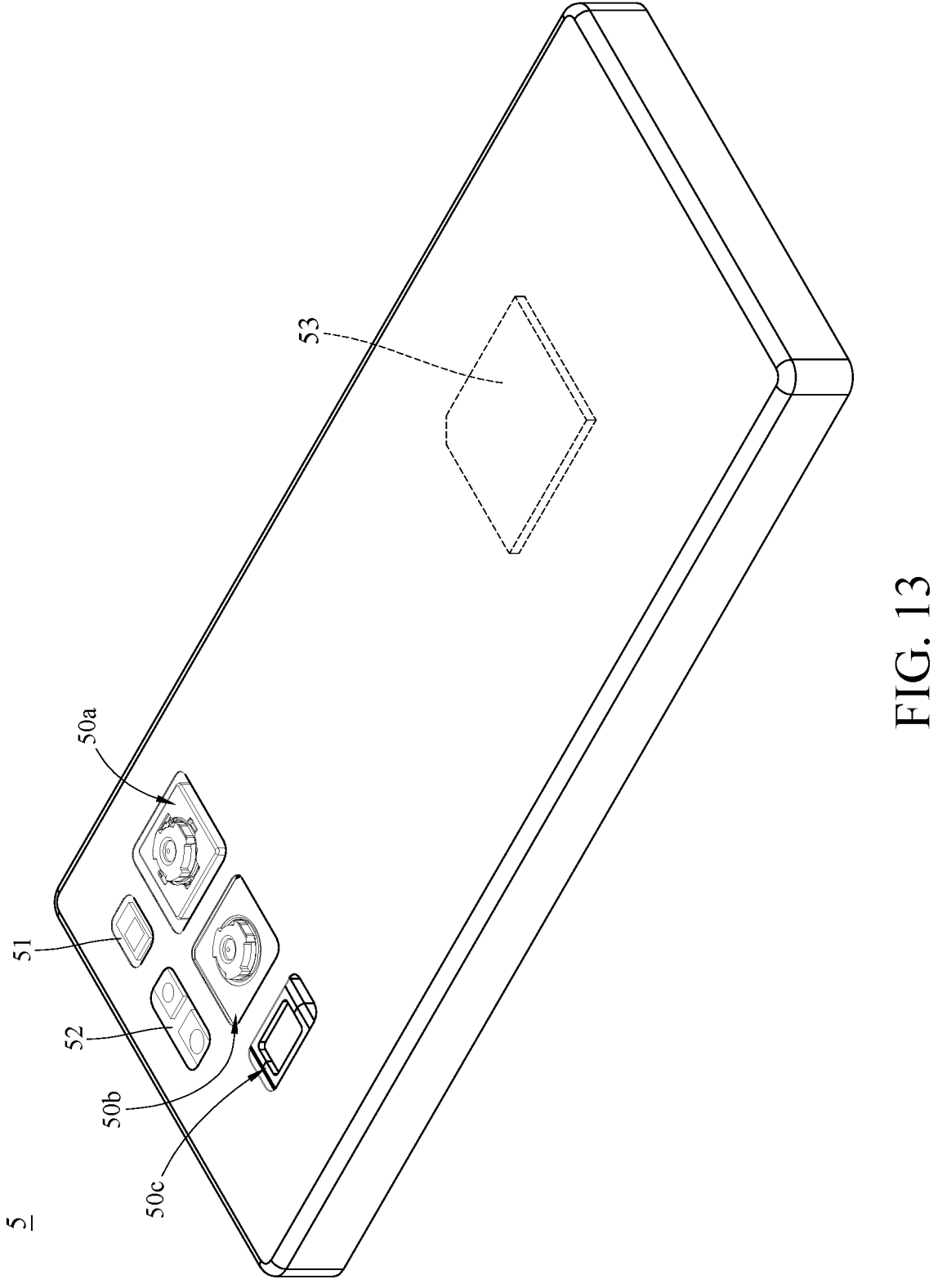
FIG. 13 is one perspective view of an electronic device according to the 5th embodiment of the present disclosure.
Figure 14:
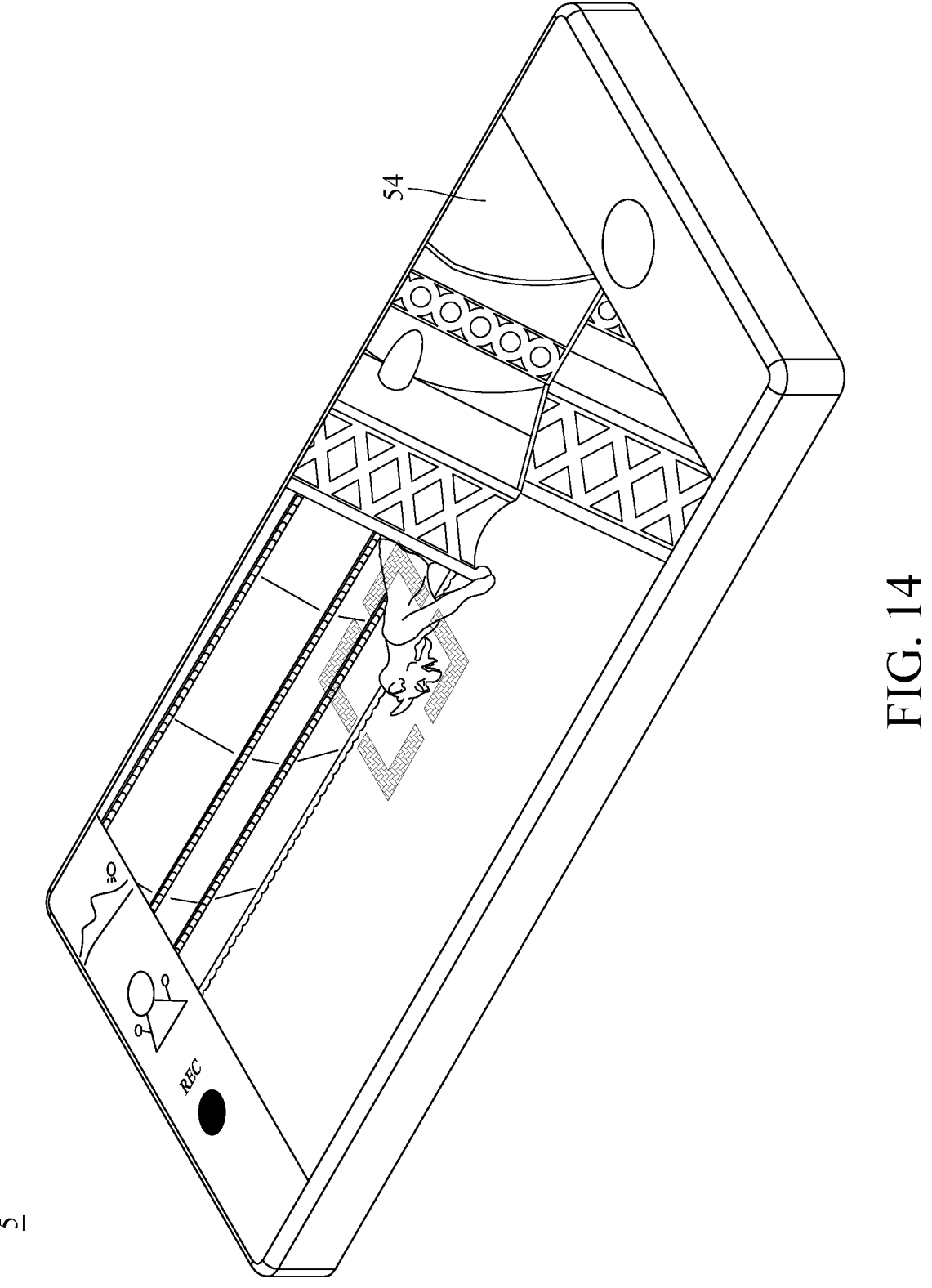
FIG. 14 is another perspective view of the electronic device in FIG. 13.

Please refer to FIG. 13 and FIG. 14. FIG. 13 is one perspective view of an electronic device according to the 5th embodiment of the present disclosure, and FIG. 14 is another perspective view of the electronic device in FIG. 13.

In this embodiment, the electronic device 5 is a smartphone including a plurality of camera modules, a flash module 51, a focus assist module 52, an image signal processor 53, a display module (user interface) 54 and an image software processor (not shown).

The camera modules include an ultra-wide-angle camera module 50a, a high pixel camera module 50b and a telephoto camera module 50c. Moreover, at least one of the camera modules 50a, 50b and 50c includes the imaging lens assembly of the present disclosure and an image sensor disposed on an image surface of the imaging lens assembly.

Figure 15:
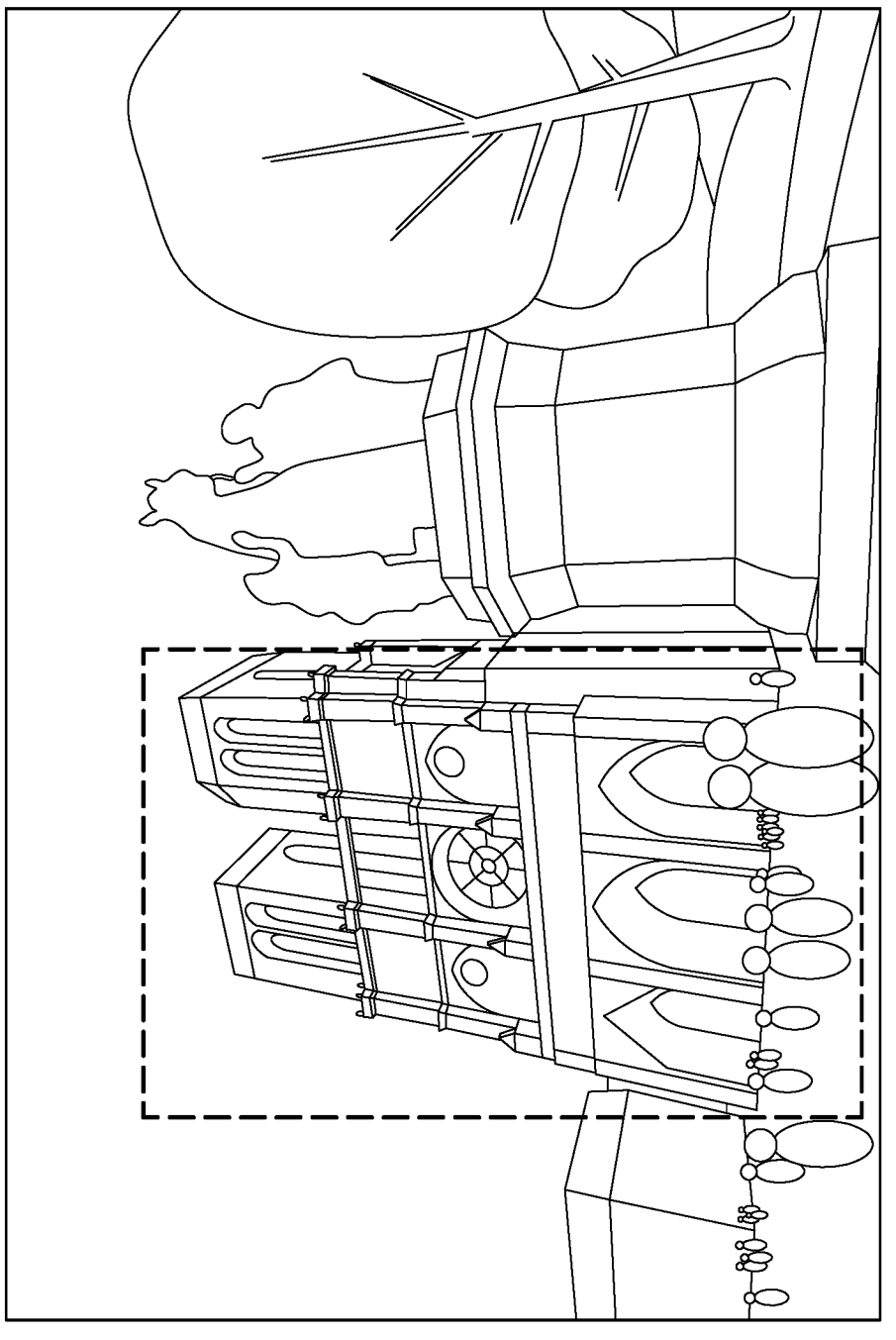
FIG. 15 is an image captured by an ultra-wide-angle camera module.

The image captured by the ultra-wide-angle camera module 50a enjoys a feature of multiple imaged objects. FIG. 15 is an image captured by the ultra-wide-angle camera module 50a.

Figure 16:
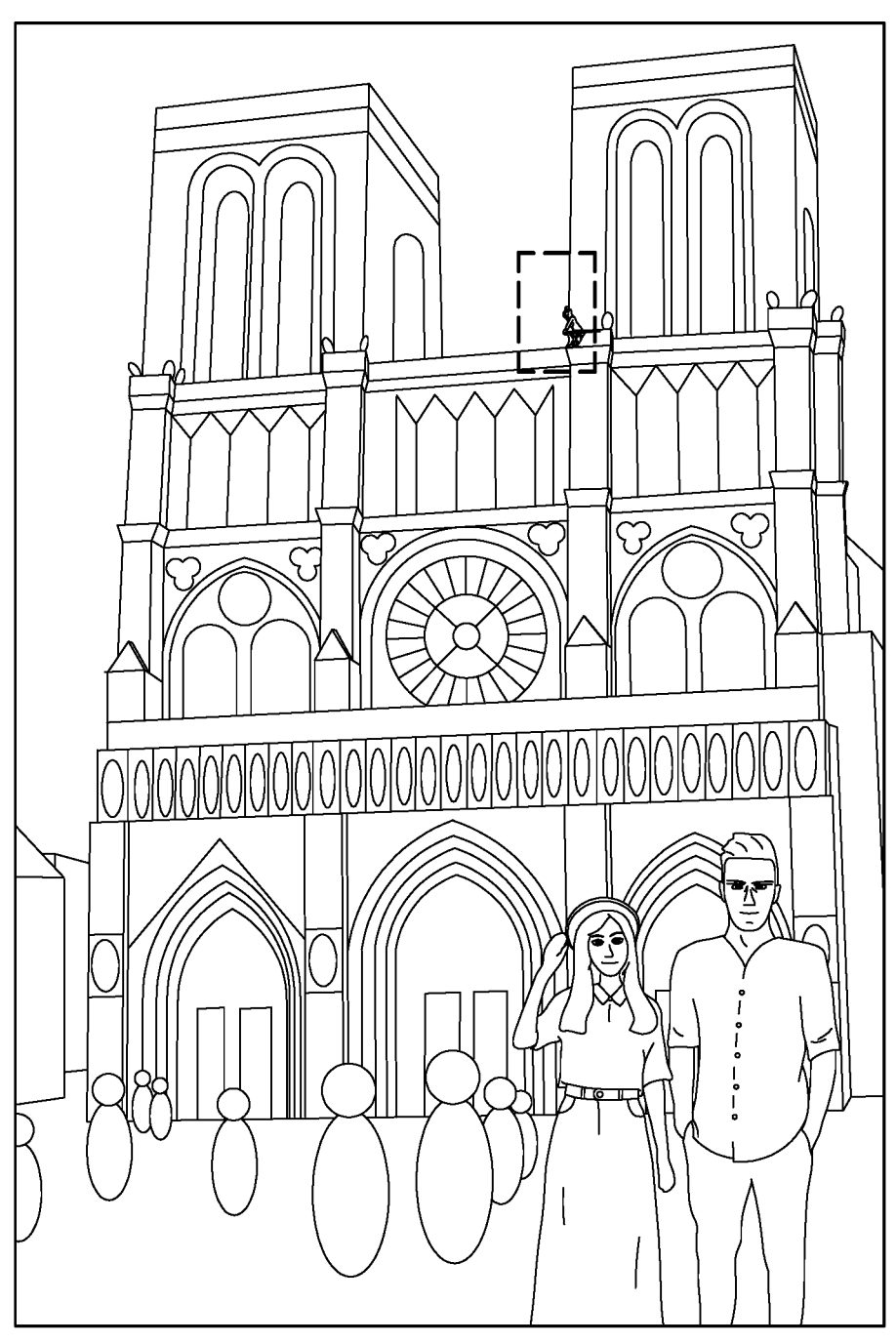
FIG. 16 is an image captured by a high pixel camera module.

The image captured by the high pixel camera module 50b enjoys a feature of high resolution and less distortion, and the high pixel camera module 50b can capture part of the image in FIG. 15. FIG. 16 is an image captured by the high pixel camera module 50b.

Figure 17:
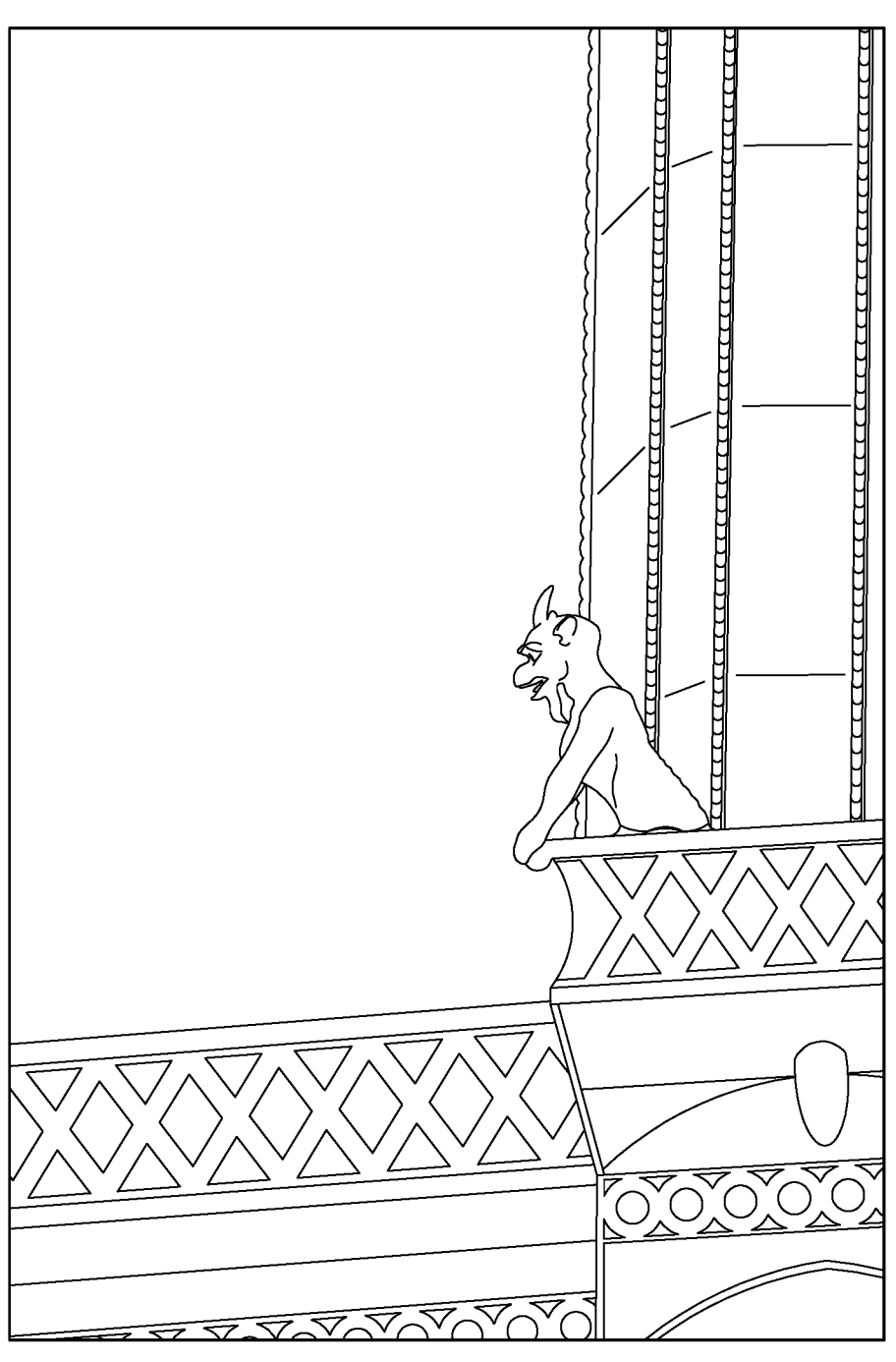
FIG. 17 is an image captured by a telephoto camera module.

The image captured by the telephoto camera module 50c enjoys a feature of high optical magnification, and the telephoto camera module 50c can capture part of the image in FIG. 16. FIG. 17 is an image captured by the telephoto camera module 50c. The maximum field of view (FOV) of the camera module corresponds to the field of view in FIG. 17.

When a user captures images of an object, the light rays converge in the ultra-wide-angle camera module 50a, the high pixel camera module 50b or the telephoto camera module 50c to generate images, and the flash module 51 is activated for light supplement. The focus assist module 52 detects the object distance of the imaged object to achieve fast auto focusing. The image signal processor 53 is configured to optimize the captured image to improve image quality and provided zooming function. The light beam emitted from the focus assist module 52 can be either conventional infrared or laser. The display module 54 can include a touch screen, and the user is able to interact with the display module 54 to adjust the angle of view and switch between different camera modules, and the image software processor having multiple functions to capture images and complete image processing. Alternatively, the user may capture images via a physical button. The image processed by the image software processor can be displayed on the display module 54.

6th Embodiment

Figure 18:
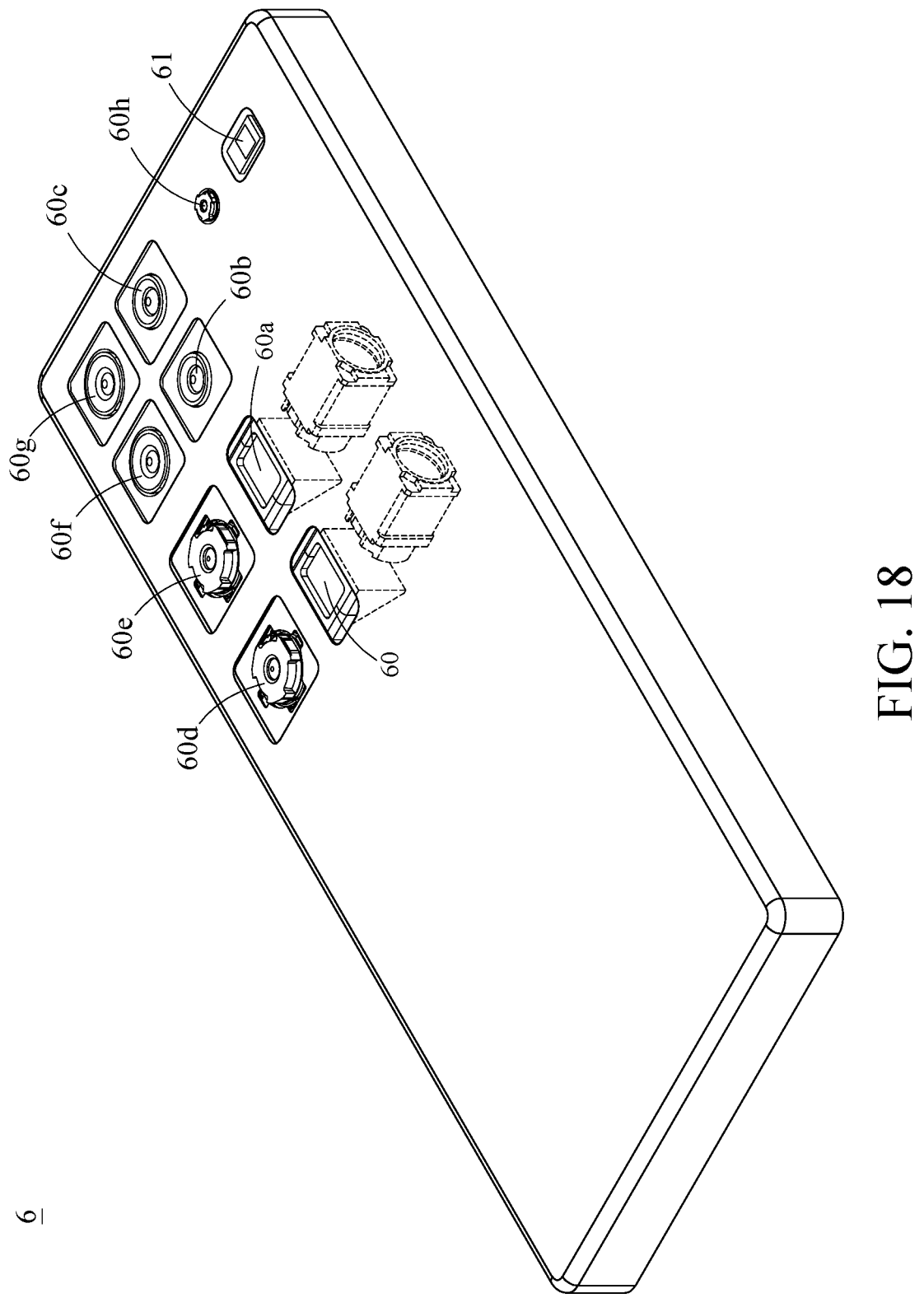
FIG. 18 is one perspective view of an electronic device according to the 6th embodiment of the present disclosure.

Please refer to FIG. 18, which is one perspective view of an electronic device according to the 6th embodiment of the present disclosure.

In this embodiment, the electronic device 6 is a smartphone including a camera module 60, a camera module 60a, a camera module 60b, a camera module 60c, a camera module 60d, a camera module 60e, a camera module 60f, a camera module 60g, a camera module 60h, a flash module 61, an image signal processor, a display module and an image software processor (not shown). The camera module 60, the camera module 60a, the camera module 60b, the camera module 60c, the camera module 60d, the camera module 60e, the camera module the camera module 60g and the camera module 60h are disposed on the same side of the electronic device 6, while the display module is disposed on the opposite side of the electronic device 6. At least one of the camera modules 60, 60b, 60c, 60d, 60e, 60f, 60g and 60h includes the imaging lens assembly of the present disclosure and an image sensor disposed on an image surface of the imaging lens assembly.

The camera module 60 is a telephoto camera module, the camera module is a telephoto camera module, the camera module 60b is a telephoto camera module, the camera module 60c is a telephoto camera module, the camera module is a wide-angle camera module, the camera module 60e is a wide-angle camera module, the camera module 60f is an ultra-wide-angle camera module, the camera module 60g is an ultra-wide-angle camera module, and the camera module 60h is a ToF (time of flight) camera module. In this embodiment, the camera module 60, the camera module 60a, the camera module 60b, the camera module 60c, the camera module 60d, the camera module 60e, the camera module and the camera module 60g have different fields of view, such that the electronic device 6 can have various magnification ratios so as to meet the requirement of optical zoom functionality. In addition, the camera module 60 and the camera module 60a are telephoto camera modules having a light-folding element configuration. In addition, the camera module 60h can determine depth information of the imaged object. In this embodiment, the electronic device 6 includes multiple camera modules 60, 60a, 60b, 60c, 60d, 60e, 60f, 60g, and 60h, but the present disclosure is not limited to the number and arrangement of camera module. When a user captures images of an object, the light rays converge in the camera modules 60, 60a, 60b, 60c, 60d, 60e, 60f, 60g or 60h to generate an image(s), and the flash module 61 is activated for light supplement. Further, the subsequent processes are performed in a manner similar to the above-mentioned embodiments, so the details in this regard will not be provided again.

7th Embodiment

Figure 19:
FIG. 19 is a perspective view of an electronic device according to the 7th embodiment of the present disclosure.
Figure 20:
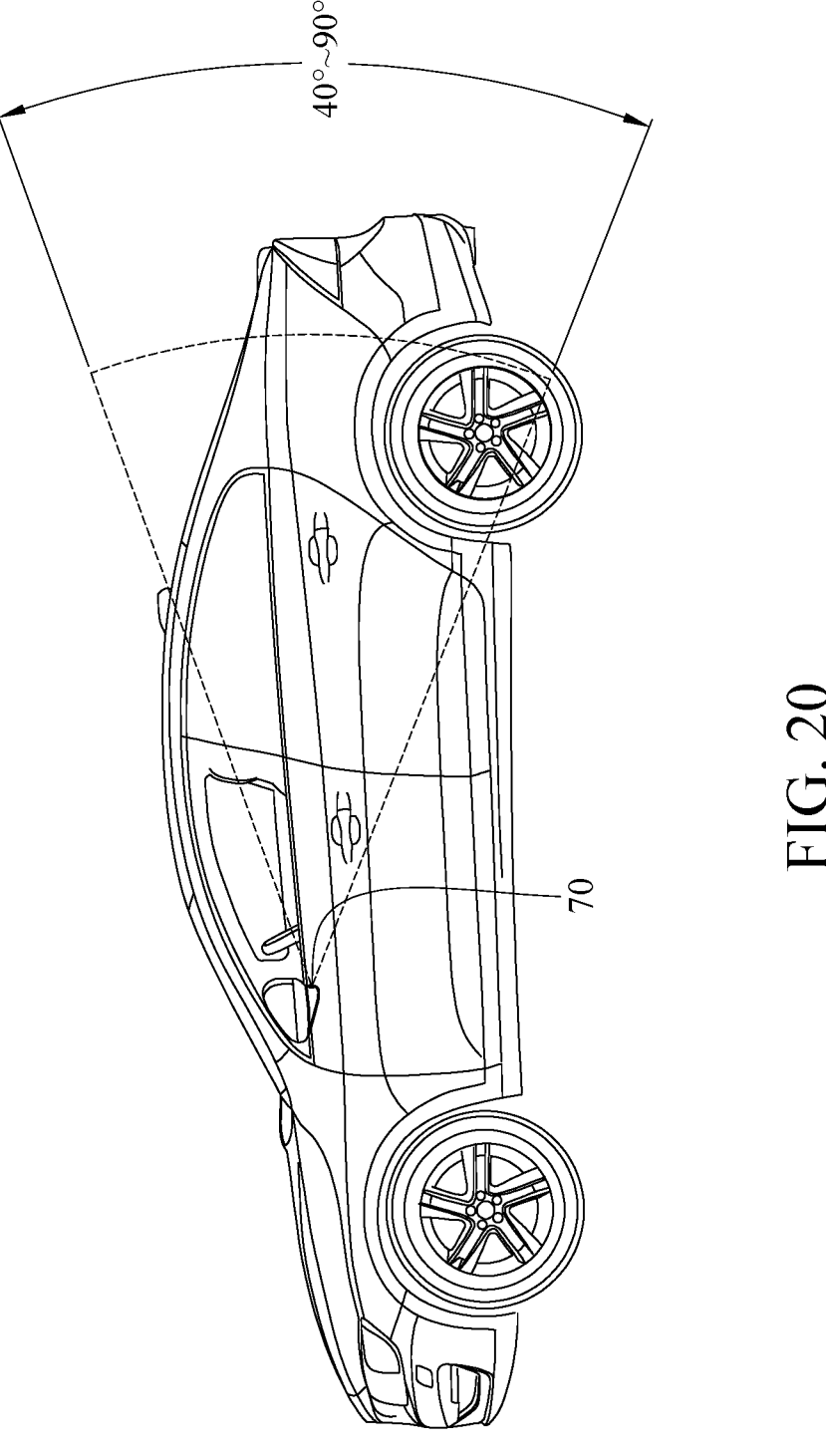
FIG. 20 is a side view of the electronic device in FIG. 19.
Figure 21:
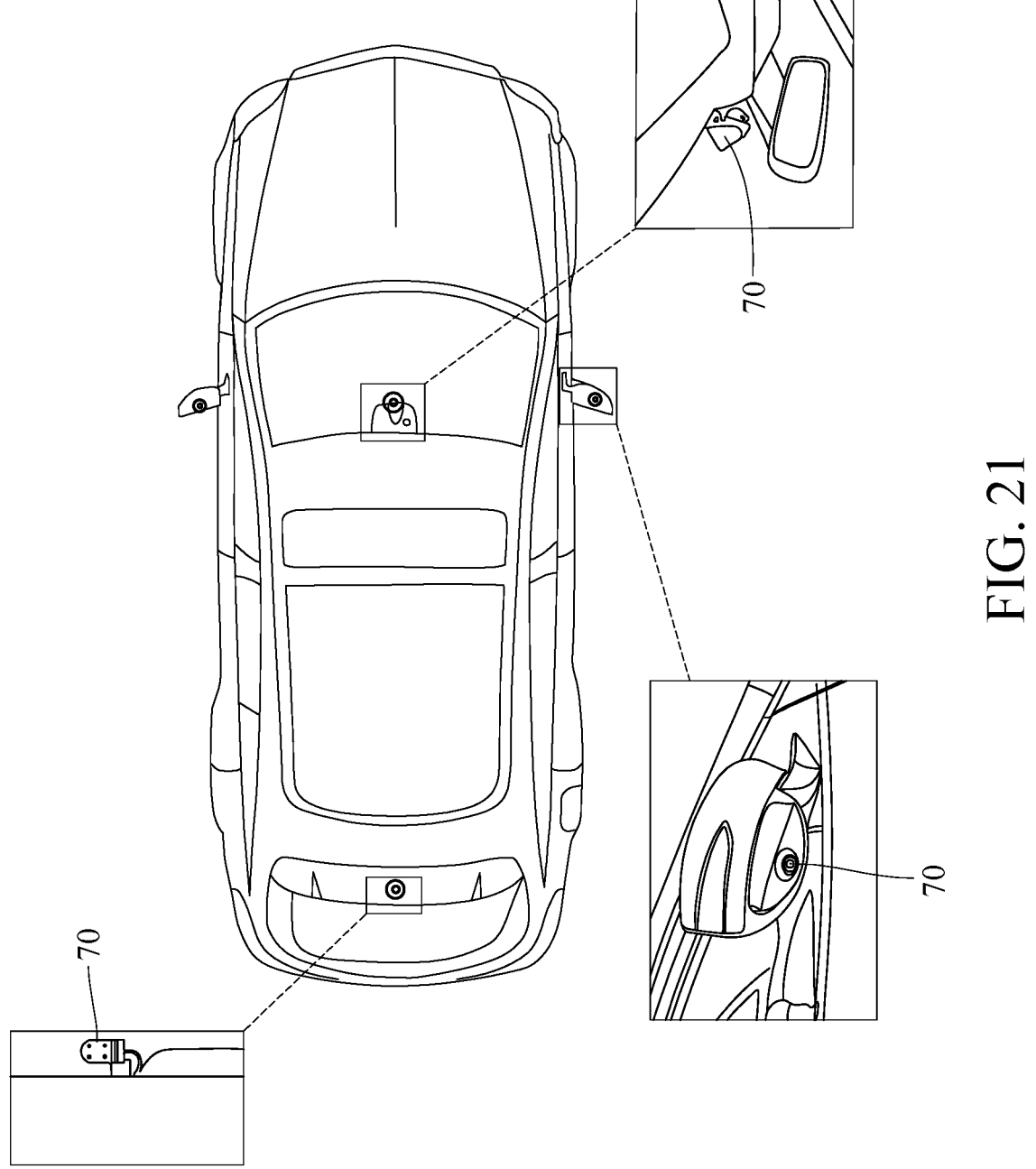
FIG. 21 is a top view of the electronic device in FIG. 19.

Please refer to FIG. 19 to FIG. 21. FIG. 19 is a perspective view of an electronic device according to the 7th embodiment of the present disclosure, FIG. 20 is a side view of the electronic device in FIG. 19, and FIG. 21 is a top view of the electronic device in FIG. 19.

In this embodiment, the electronic device 7 is an automobile. The electronic device 7 includes a plurality of automotive camera modules 70, and at least one of the camera modules 70 includes the imaging lens assembly of the present disclosure and an image sensor disposed on an image surface of the imaging lens assembly. The camera modules 70 can be served as, for example, panoramic view car cameras, dashboard cameras and vehicle backup cameras.

As shown in FIG. 19, the camera modules 70 are, for example, disposed around the automobile to capture peripheral images of the automobile, which is favorable for obtaining external traffic information so as to achieve autopilot function. In addition, the image software processor may blend the peripheral images into one panoramic view image for the driver's checking every corner surrounding the automobile, thereby favorable for parking and driving.

As shown in FIG. 20, the camera modules 70 are, for example, respectively disposed on the lower portion of the side mirrors. A maximum field of view of the camera modules 70 can be 40 degrees to 90 degrees for capturing images in regions on left and right lanes.

As shown in FIG. 21, the camera modules 70 can also be, for example, respectively disposed on the lower portion of the side mirrors and inside the front and rear windshields for providing external information to the driver, and also providing more viewing angles so as to reduce blind spots, thereby improving driving safety.

The smartphones, panoramic view car cameras, dashboard cameras and vehicle backup cameras in the embodiments are only exemplary for showing the imaging lens assembly and the camera module of the present disclosure installed in an electronic device, and the present disclosure is not limited thereto. The imaging lens assembly and the camera module can be optionally applied to optical systems with a movable focus. Furthermore, the imaging lens assembly and the camera module feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising:
a first plastic lens element, wherein an optical axis of the imaging lens assembly passes through the first plastic lens element, and the first plastic lens element comprises, in order from a paraxial region thereof to a peripheral region thereof:
a first optically effective portion;
a first size reduction portion, wherein each of an object-side surface and an image-side surface of the first size reduction portion has at least one roughened surface; and
a first peripheral portion configured to be in physical contact and assembled with adjacent components; and
a second plastic lens element disposed on an image side of the first plastic lens element, wherein the optical axis passes through the second plastic lens element, and the second plastic lens element comprises, in order from a paraxial region thereof to a peripheral region thereof:
a second optically effective portion;
a second size reduction portion, wherein each of an object-side surface and an image-side surface of the second size reduction portion has at least one roughened surface; and
a second peripheral portion configured to be in physical contact and assembled with adjacent components;
wherein the imaging lens assembly further comprises a glass lens element, and the glass lens element is disposed corresponding to one of the first plastic lens element and the second plastic lens element;
wherein at least one of the roughened surfaces is in physical contact with other optical element of the imaging lens assembly; and
wherein a central thickness of the first optically effective portion is CT1, a central thickness of the second optically effective portion is CT2, a minimum thickness of the first size reduction portion is ET1m, a peripheral thickness of the first optically effective portion is ET1, a minimum thickness of the second size reduction portion is ET2m, a peripheral thickness of the second optically effective portion is ET2, an edge thickness of the glass lens element is PTG, a central thickness of the glass lens element is CTG, and the following conditions are satisfied:

$$CT1 \leq 0.33 \text{ mm};$$

$$CT2 \leq 0.33 \text{ mm};$$

$$ET1m/ET1 \leq 1.0;$$

$$ET2m/ET2 \leq 1.0; \text{ and}$$

$$0.12 \leq PTG/CTG \leq 1.05.$$

2. The imaging lens assembly of claim 1, wherein the central thickness of the first optically effective portion is CT1, and the following condition is satisfied:

$$CT1 \leq 0.3 \text{ mm}.$$

3. The imaging lens assembly of claim 1, wherein the central thickness of the second optically effective portion is CT2, and the following condition is satisfied:

$$CT2 \leq 0.3 \text{ mm}.$$

4. The imaging lens assembly of claim 1, wherein the first peripheral portion has a first axial alignment structure, the second peripheral portion has a second axial alignment structure, and the first axial alignment structure is disposed corresponding to the second axial alignment structure, so that the first plastic lens element and the second plastic lens element are coaxially arranged and aligned with each other.

5. The imaging lens assembly of claim 4, further comprising a third plastic lens element, wherein the third plastic lens element has a third axial alignment structure disposed corresponding to one of the first axial alignment structure and the second axial alignment structure, so that the first plastic lens element, the second plastic lens element and the third plastic lens element are coaxially arranged and aligned with one another.

6. The imaging lens assembly of claim 1, wherein the glass lens element is disposed on an object side of the first plastic lens element.

7. The imaging lens assembly of claim 1, wherein the glass lens element is disposed on an image side of the second plastic lens element.

8. The imaging lens assembly of claim 1, wherein the at least one roughened surface of the object-side surface of the first size reduction portion is disposed corresponding to the at least one roughened surface of the image-side surface of the first size reduction portion in a direction parallel to the optical axis.

9. The imaging lens assembly of claim 1, wherein a total number of lens elements in the imaging lens assembly is N, and the following condition is satisfied:

$$N \geq 5.$$

10. An imaging lens assembly comprising:

a first plastic lens element, wherein an optical axis of the imaging lens assembly passes through the first plastic lens element, and the first plastic lens element comprises, in order from a paraxial region thereof to a peripheral region thereof:

a first optically effective portion;

a first size reduction portion, wherein each of an object-side surface and an image-side surface of the first size reduction portion has at least one roughened surface; and a first peripheral portion configured to be in physical contact and assembled with adjacent components; and a second plastic lens element disposed on an image side of the first plastic lens element, wherein the optical axis passes through the second plastic lens element, and the second plastic lens element comprises, in order from a paraxial region thereof to a peripheral region thereof:

a second optically effective portion;

a second size reduction portion, wherein each of an object-side surface and an image-side surface of the second size reduction portion has at least one roughened surface; and a second peripheral portion, configured to be in physical contact and assembled with adjacent components;

wherein a central thickness of the first optically effective portion is CT1, a central thickness of the second optically effective portion is CT2, a minimum thickness of the first size reduction portion is ET1m, a peripheral thickness of the first optically effective portion is ET1, a minimum thickness of the second size reduction portion is ET2m, a peripheral thickness of the second optically effective portion is ET2, a release force required to release the roughened surfaces of the first size reduction portion is Fr1, a release force required to release the first optically effective portion is Fs1, a release force required to release the roughened surfaces of the second size reduction portion is Fr2, a release force required to release the second optically effective portion is Fs2, and the following conditions are satisfied:

$$CT1 \leq 0.33 \text{ mm};$$

$$CT2 \leq 0.33 \text{ mm};$$

$$ET1m/ET1 \leq 1.0;$$

$$ET2m/ET2 \leq 1.0;$$

$$1.5 \leq Fr1/Fs1 \leq 25; \text{ and}$$

$$1.5 \leq Fr2/Fs2 \leq 25.$$

11. The imaging lens assembly of claim 10, wherein a release force required to release the at least one roughened surface of the image-side surface of the first size reduction portion is $Fr1\_i$, a release force required to release the first optically effective portion of is Fs1, and the following condition is satisfied:

$$5 \leq Fr1\_i/Fs1 \leq 25.$$

12. The imaging lens assembly of claim 10, wherein a release force required to release the at least one roughened surface of the image-side surface of the second size reduction portion is $Fr2\_i$, a release force required to release the second optically effective portion is Fs2, and the following condition is satisfied:

$$5 \leq Fr2\_i/Fs2 \leq 25.$$

13. The imaging lens assembly of claim 10, wherein a central thickness of the first optically effective portion is CT1, and the following condition is satisfied:

$$CT1 \leq 0.3 \text{ mm}.$$

14. The imaging lens assembly of claim 10, wherein a central thickness of the second optically effective portion is CT2, and the following condition is satisfied:

$$CT2 \leq 0.3 \text{ mm}.$$

15. The imaging lens assembly of claim 10, wherein the first peripheral portion has a first axial alignment structure, the second peripheral portion has a second axial alignment structure, and the first axial alignment structure is disposed corresponding to the second axial alignment structure, so that the first plastic lens element and the second plastic lens element are coaxially arranged and aligned with each other.

16. The imaging lens assembly of claim 15, further comprising a third plastic lens element, wherein the third plastic lens element has a third axial alignment structure disposed corresponding to one of the first axial alignment structure and the second axial alignment structure, so that the first plastic lens element, the second plastic lens element and the third plastic lens element are coaxially arranged and aligned with one another.

17. The imaging lens assembly of claim 10, wherein the at least one roughened surface of the object-side surface of the first size reduction portion is disposed corresponding to the at least one roughened surface of the image-side surface of the first size reduction portion in a direction parallel to the optical axis.

18. The imaging lens assembly of claim 10, wherein a total number of lens elements in the imaging lens assembly is N, and the following condition is satisfied:

$$N \geq 5.$$

19. A camera module comprising:

the imaging lens assembly of claim 10; and an image sensor disposed on an image surface of the imaging lens assembly.

20. An electronic device comprising:

the camera module of claim 19.

* * * * *